(12) United States Patent
Safai et al.

(10) Patent No.: US 11,017,491 B2
(45) Date of Patent: May 25, 2021

(54) NONCONFORMANCE DETECTION SYSTEM

(71) Applicant: The Boeing Company, Chicago, IL (US)

(72) Inventors: Morteza Safai, Newcastle, WA (US); Gary Ernest Georgeson, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 123 days.

(21) Appl. No.: 16/548,538

(22) Filed: Aug. 22, 2019

(65) Prior Publication Data
US 2021/0056658 A1    Feb. 25, 2021

(51) Int. Cl.
*G06T 1/00* (2006.01)
*G06T 7/521* (2017.01)
*G06T 7/00* (2017.01)

(52) U.S. Cl.
CPC .......... *G06T 1/0014* (2013.01); *G06T 7/0008* (2013.01); *G06T 7/521* (2017.01); *G06T 2207/10048* (2013.01); *G06T 2207/20224* (2013.01); *G06T 2207/30156* (2013.01)

(58) Field of Classification Search
None
See application file for complete search history.

(56) References Cited

U.S. PATENT DOCUMENTS

| | | | | |
|---|---|---|---|---|
| 5,111,048 A * | 5/1992 | Devitt | ............... | G01N 25/72 250/341.6 |
| 6,495,833 B1 * | 12/2002 | Alfano | ............... | G01N 21/4795 250/330 |
| 7,312,454 B2 * | 12/2007 | Safai | ............... | G01N 21/9515 250/347 |
| 7,520,666 B2 * | 4/2009 | Pevzner | ............... | G01N 25/72 374/121 |
| 7,553,070 B2 * | 6/2009 | Kollgaard | ............... | G01N 25/72 250/341.1 |
| 10,260,953 B2 * | 4/2019 | Engelbart | ............... | G01N 25/72 |
| 10,670,539 B1 * | 6/2020 | Wang | ............... | G06T 7/001 |
| 2004/0026622 A1 * | 2/2004 | DiMarzio | ............... | G01N 21/88 250/341.8 |
| 2004/0196453 A1 * | 10/2004 | Some | ............... | G01N 25/72 356/237.1 |
| 2013/0320103 A1 * | 12/2013 | Margalit | ............... | B64D 45/00 239/1 |
| 2016/0093034 A1 * | 3/2016 | Beck | ............... | G06T 3/4061 345/617 |

* cited by examiner

*Primary Examiner* — Anand P Bhatnagar
(74) *Attorney, Agent, or Firm* — Yee & Associates, P.C.

(57) ABSTRACT

A method, apparatus, and system for generating images. An imaging system comprises a computer system with a controller. The controller is configured to receive from a shearography camera system an unloaded visible light image generated of a coating in an area of a structure while the area is in an unloaded state and a loaded visible light image generated while the area is in a loaded state and receive from an infrared camera system an unloaded thermal image generated while the area is in the unloaded state and a loaded thermal image generated while the area is in the loaded state. The controller is configured to subtract the loaded visible light image from the unloaded visible light image to form a subtracted visible light image. The controller is configured to subtract the loaded thermal image from the unloaded thermal image to form a subtracted thermal image.

37 Claims, 19 Drawing Sheets

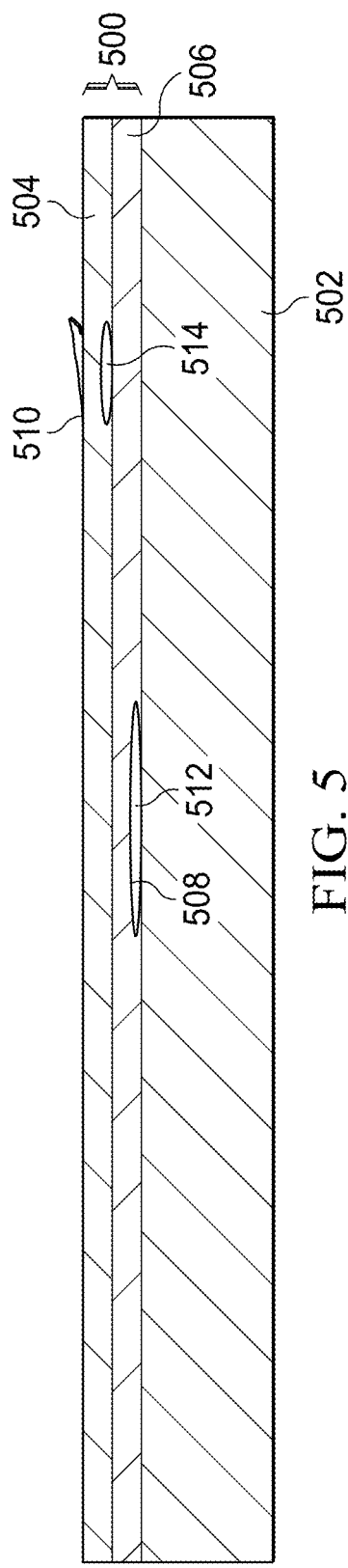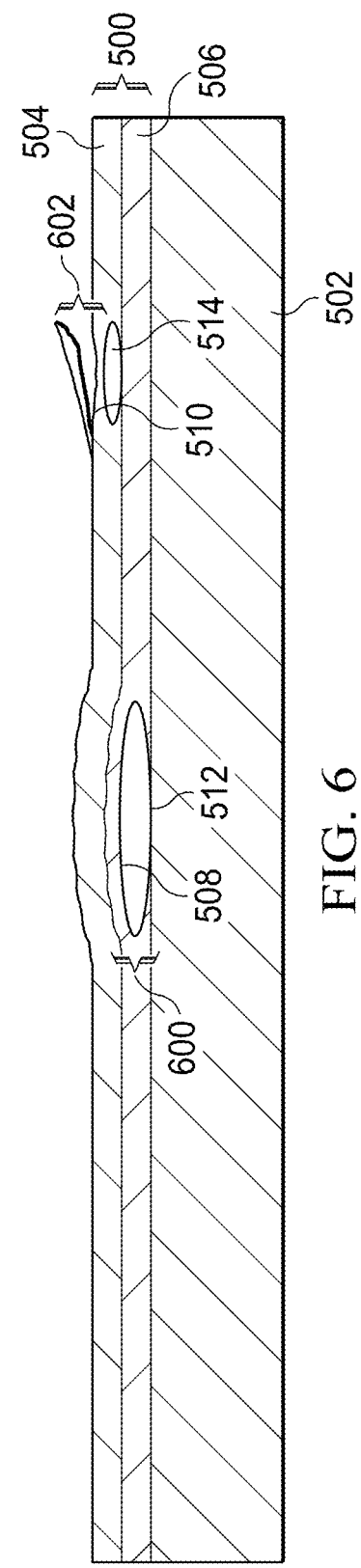

NONCONFORMANCE DETECTION SYSTEM

BACKGROUND INFORMATION

1. Field

The present disclosure relates generally to detecting nonconformances and in particular, to detecting nonconformances in a coating on a structure. Still more particularly, the present disclosure relates to a method, apparatus, and system for detecting nonconformances in a coating on a structure that should be reworked.

2. Background

Nondestructive inspection includes a number of different techniques that are used to evaluate properties of a material, a structure, or a system without causing damage. Nondestructive inspection can include techniques such as current testing, magnetic particle inspection, liquid penetrant inspection, radiography, ultrasonic testing, and visual testing.

For example, a coating such as a layer of paint on a metal skin panel for a wing of an aircraft can be inspected for nonconformances. The inspection can be performed during routine maintenance, upgrading, reconfiguration, or refurbishment of the aircraft. The inspection may include a visual inspection in which the human operator directly views areas of the aircraft or reviews images of the aircraft.

This inspection may reveal nonconformances, such as cracks in the paint. In some cases, the cracks detected during a visual inspection may be superficial or sufficiently minor such that reworking the area in which these cracks are located is unnecessary. In other cases, the cracks may be deeper or more extensive.

For example, delamination or debonding may be present in the paint. With these types of nonconformances, moisture can enter the paint and reach the underlying metal skin panel and cause corrosion. Determining the extent or severity of a crack with respect to a potential for corrosion is difficult with a visual inspection.

Currently, shearography can be used to optically detect the presence of nonconformances that are at or near the surface of the paint on the exterior of an aircraft. Shearography, however, is not as useful in quantifying the extent of nonconformances. Not all cracks detected in the paint through a visual inspection using shearography are severe enough to need rework to avoid corrosion.

Determining whether a crack extends deep enough to result in moisture reaching the underlying metal skin panel and causing corrosion cannot be performed using shearography. As a result, quantifying the extent of cracks is difficult without removing the paint. Removal of the paint for more detailed inspection results in the area being reworked regardless of whether the crack is superficial or is deep enough to cause corrosion. Consequently, when areas in which cracks are detected in the paint of an aircraft, these areas are reworked to avoid missing cracks that may be deep enough to cause corrosion in a metal skin panel.

Thus, reworking areas in which cracks are detected in the paint can result in reworking areas in which the cracks are not sufficiently severe to cause corrosion in the underlying metal skin panel. As a result, maintenance on the paint of an aircraft may be more time consuming and expensive than needed to avoid potential corrosion.

Therefore, it would be desirable to have a method and apparatus that take into account at least some of the issues discussed above, as well as other possible issues. For example, it would be desirable to have a method and apparatus that overcome a technical problem with detecting nonconformances that require reworking of a coating.

SUMMARY

An embodiment of the present disclosure provides an imaging system comprising a vacuum chamber, a load generator, a laser system, a shearography camera system, an infrared camera system, and a controller. The vacuum chamber is configured to apply a vacuum to an area with a coating on a structure. The load generator is configured to place the area into a loaded state from an unloaded state. The laser system is configured to direct a laser beam towards a surface of the coating in the area. The shearography camera system is configured to generate an unloaded visible light image of the area in the unloaded state and a loaded visible light image of the area in the loaded state, while the laser beam is directed toward the surface of the coating. The infrared camera system is configured to detect infrared radiation and generate an unloaded thermal image of the area in the unloaded state and a loaded thermal image of the area in the loaded state from the infrared radiation detected. The controller is configured to receive the unloaded visible light image, the loaded visible light image, the unloaded thermal image, and the loaded thermal image; subtract the loaded visible light image from the unloaded visible light image to form a subtracted visible light image; and subtract the loaded thermal image from the unloaded thermal image to form a subtracted thermal image.

Another embodiment of the present disclosure provides an imaging system which comprises a computer system with a controller. The controller is configured to receive, from a shearography camera system, an unloaded visible light image generated of a coating an area of a structure while the area is in an unloaded state and a loaded visible light image generated while the area is in a loaded state, and receive, from an infrared camera system, an unloaded thermal image generated while the area is in the unloaded state and a loaded thermal image generated while the area is in the loaded state. The controller is configured to subtract the loaded visible light image from the unloaded visible light image to form a subtracted visible light image. The controller is configured to subtract the loaded thermal image from the unloaded thermal image to form a subtracted thermal image.

Yet another embodiment of the present disclosure provides a method for detecting nonconformances. An area of a coating on a structure is placed into a loaded state from an unloaded state. A laser beam is directed towards a surface of the coating in the area of the structure. Unloaded visible light images of the area are generated in the unloaded state and loaded visible light images of the area are generated in the loaded state. Unloaded thermal images of the area are generated in the unloaded state and loaded thermal images of the area are generated in the loaded state. Loaded visible light images are subtracted from the unloaded visible light images to form subtracted visible light images. The loaded thermal images are subtracted from the unloaded thermal images to form subtracted thermal images. A determination is made as to whether a nonconformance is present using the subtracted visible light images and the subtracted thermal images.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 5 is an illustration of a cross-section of a structure with a coating with nonconformances in an unloaded state in accordance with an illustrative embodiment;

FIG. 6 is an illustration of a cross-section of a structure with a coating with nonconformances in a loaded state in accordance with an illustrative embodiment;

DETAILED DESCRIPTION

Figure 1:
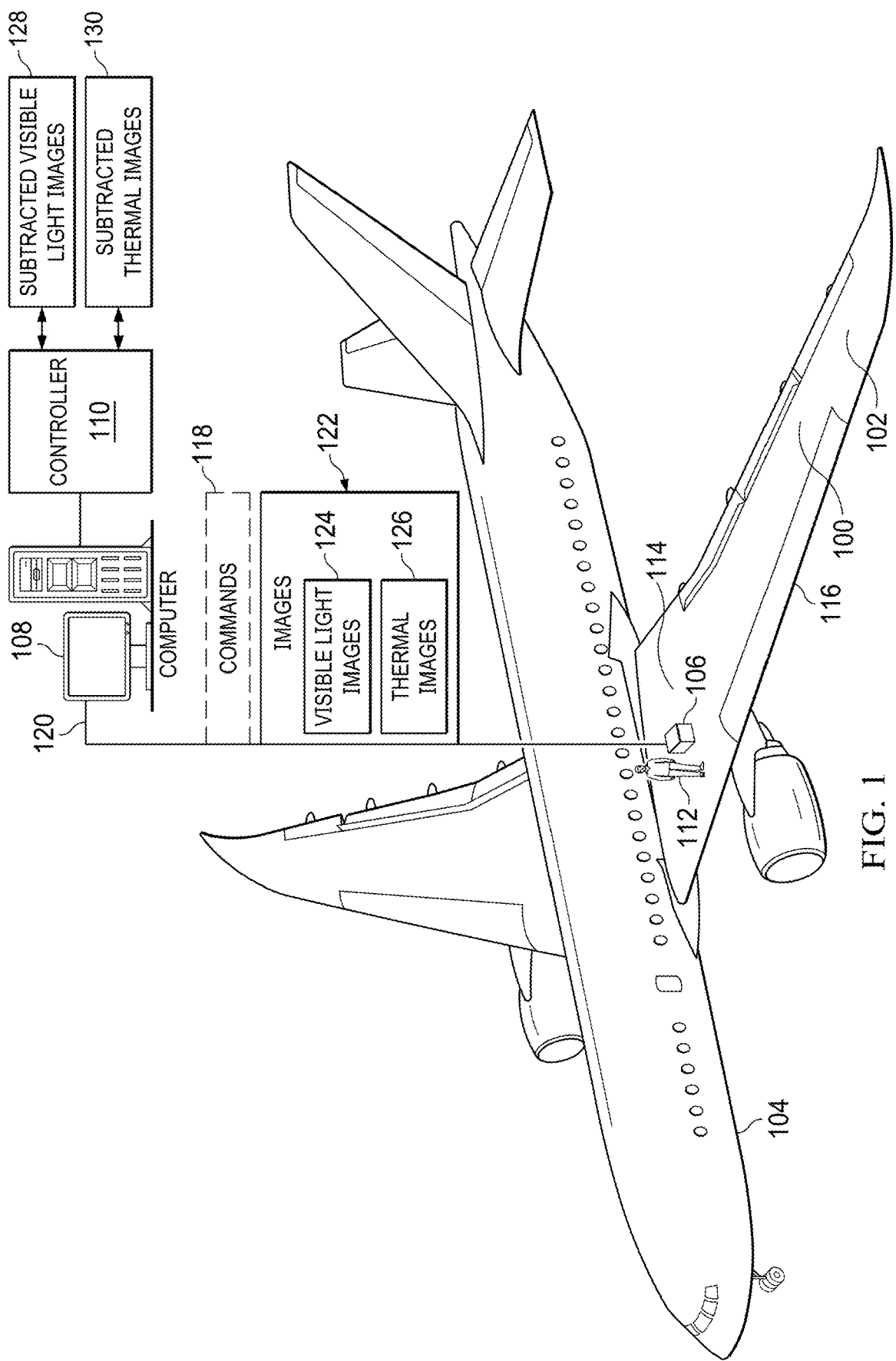
FIG. 1 is an illustration of components for performing a paint inspection on an aircraft in accordance with an illustrative embodiment.

The illustrative embodiments recognize and take into account one or more different considerations. For example, the illustrative embodiments recognize and take into account that shearography can optically detect differences in a surface of a coating when the coating is placed into a loaded state from an unloaded state. The illustrative embodiments recognize and take into account, however, that when a nonconformance is deep within the coating or a structure is too stiff to cause a displacement in the surface, the nonconformance does not appear in images.

The illustrative embodiments recognize and take into account that shearography techniques can apply a load using a vacuum. The illustrative embodiments recognize and take into account that this type of load source may not be sufficient to increase the prominence of nonconformances, such as delamination or debonding, sufficiently to detect the presence of these types of nonconformances.

The illustrative embodiments recognize and take into account that thermography can be used to detect moisture that cannot be detected by shearography. The illustrative embodiments recognize and take into account, that current thermography can be used to detect moisture that can indicate that a crack extends below the surface of a coating such as a paint layer. The illustrative embodiments recognize and take into account that current techniques do not apply a load to the structure as part of the process of generating thermal images to detect the nonconformances. The illustrative embodiments recognize and take into account that these two imaging techniques can be combined to more accurately detect nonconformances in a coating on a structure.

Thus, the illustrative embodiments provide a method, apparatus, and system for detecting nonconformances. For example, the illustrative embodiments provide a method, apparatus, and system for detecting nonconformances in a coating on a structure. An area of a coating on a structure is placed into a loaded state from an unloaded state. A laser beam is directed towards a surface in the area of the structure. Unloaded visible light images of the area are generated in the unloaded state while the laser beam scans the surface, and loaded visible light images of the area are generated in the loaded state while the laser beam scans the surface. The unloaded thermal images of the area are generated in the unloaded state while the laser beam scans the surface, and loaded thermal images of the area are generated in the loaded state while the laser beam scans the surface. Loaded visible light images are subtracted from the unloaded visible light images to form subtracted visible light images. The loaded thermal images are subtracted from the unloaded thermal images to form subtracted thermal images. A determination is made as to whether a nonconformance is present using the subtracted visible light images and the subtracted thermal images. With the illustrative examples, nonconformances that do not need rework and nonconformances that need rework can be detected.

Further, the loading can be performed using a source other than a vacuum. For example, a load generator such as a vibration unit can be used. Further, the load can be applied using frequency patterns in which the frequency can be changes in at least one of a duration or an amplitude of the load.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

With reference now to the figures and, in particular, with reference to FIG. 1, an illustration of components for performing a paint inspection on an aircraft is depicted in accordance with an illustrative embodiment. In this illustrative example, paint 100 on exterior surface 102 of aircraft 104 can be inspected using a nonconformance detection system. In this illustrative example, the nonconformance detection system is an imaging system that is comprised of imaging unit 106 and computer 108.

As depicted, imaging unit 106 is a hardware apparatus that can be operated by human operator 112. For example, human operator 112 can place imaging unit 106 in area 114 with paint 100 on exterior surface 102 on wing 116 of aircraft 104. In this illustrative example, human operator 112 activates imaging unit 106 to generate images 122. Alternatively, imaging unit 106 can be activated and controlled by controller 110 sending commands 118 over wireless connection 120. Wireless connection 120 can be implemented using a number of different wireless technologies. For example, wireless connection 120 can be established using Wi-Fi signals, Bluetooth signals, infrared signals, cellular signals, or other suitable types of signals.

In this illustrative example, imaging unit 106 is configured to generate images 122 in the form of visible light images 124 and thermal images 126. Imaging unit 106 can generate visible light images 124 using a shearography camera system (not shown) in imaging unit 106. Further, imaging unit 106 can generate thermal images 126 using an infrared camera system (not shown) in imaging unit 106. In this illustrative example, images 122 are generated while a laser beam (not shown) scans area 114 and while area 114 is in both an unloaded state and a loaded state by imaging unit 106.

Controller 110 is configured to subtract visible light images 124 generated with area 114 in the loaded state from visible light images 124 generated with area 114 in the unloaded state to generate subtracted visible light images 128. Further, controller 110 is configured to subtract thermal images 126 generated of area 114 in the loaded state from thermal images 126 generated of area 114 in the unloaded state to generate subtracted thermal images 130.

As depicted, at least one of subtracted visible light images 128 or subtracted thermal images 130 can be analyzed to determine whether a nonconformance is present in area 114 that requires rework. In this illustrative example, the analysis may be performed in a number of different ways. For example, controller 110 can perform the analysis. In other illustrative examples, at least one of subtracted visible light images 128 or subtracted thermal images 130 can be displayed on a display device for viewing by human operator 112. Human operator 112 can determine whether a nonconformance requiring rework is present in area 114.

FIG. 1 is intended as an example and not as an architectural limitation for the different illustrative embodiments. For example, a wired connection using a wired or optical fiber can be used in place of or in addition to wireless connection 120. Further, controller 110 can receive images from one or more imaging units in addition to or in place of imaging unit 106. In the illustrative examples, imaging unit 106 can be placed in area 114 and other areas by a mobile platform, a crawler robot, a robotic arm, or some other mechanism in addition or in place of human operator 112.

Figure 2:
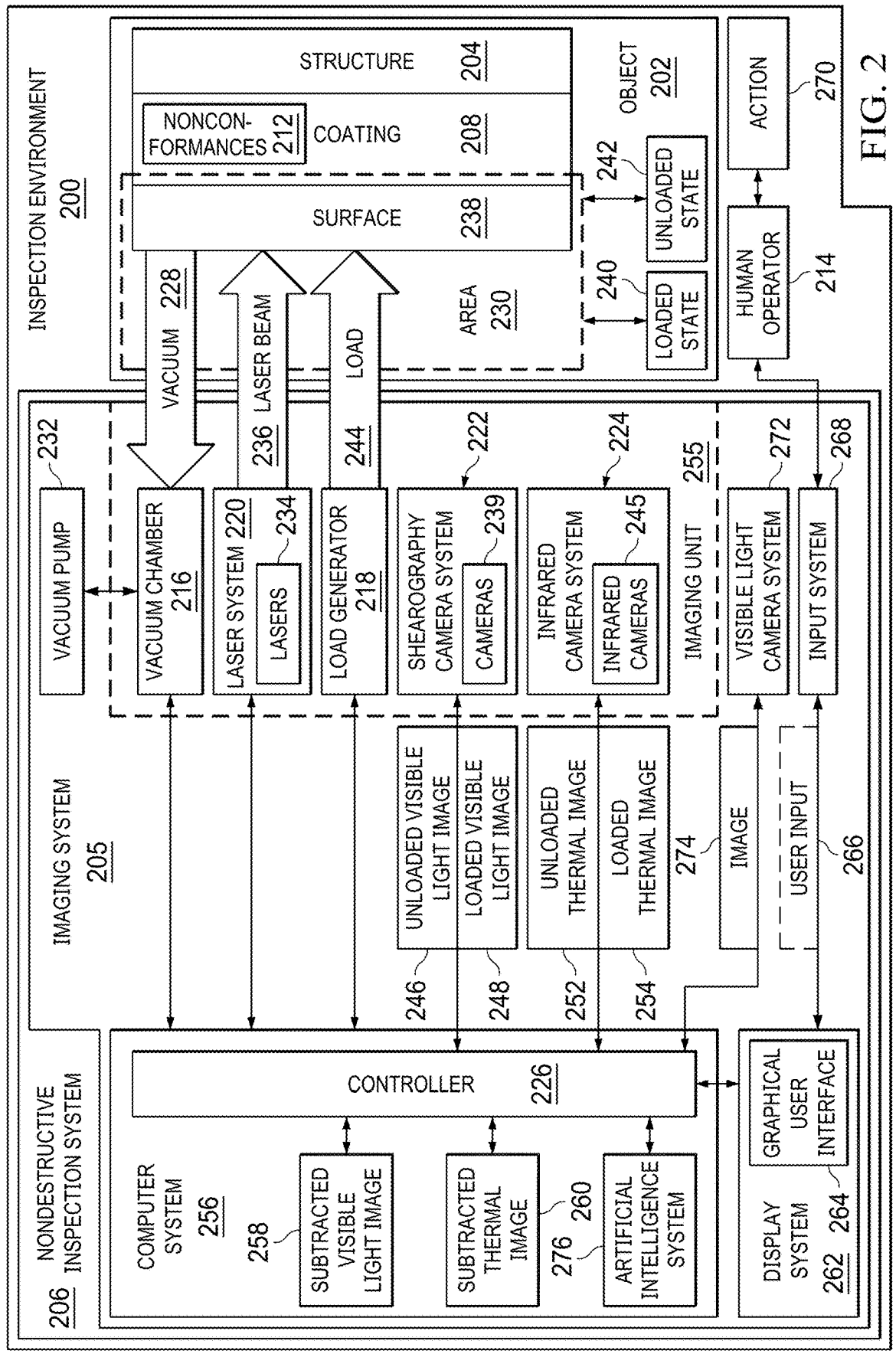
FIG. 2 is an illustration of a block diagram of an inspection environment in accordance with an illustrative embodiment.

With reference now to FIG. 2, an illustration of a block diagram of an inspection environment is depicted in accordance with an illustrative embodiment. As depicted, inspection environment 200 is the environment in which nondestructive inspection can be performed on structure 204 using imaging system 205 in nondestructive inspection system 206. Aircraft 104 in FIG. 1 is an example of object 202 that can be inspected using imaging system 205. Object 202 can take a number of different forms. For example, object 202 can be a vehicle, a train, an automobile, a truck, a tank, a spacecraft, a wing, a fuselage, a building, a manufacturing facility, and other suitable types of objects.

In this illustrative example, imaging system 205 in nondestructive inspection system 206 is configured to inspect coating 208 on structure 204 in object 202. Coating 208 can be comprised of one or more layers. For example, coating 208 can be comprised of at least one of a paint layer, a clear coat layer, a polymer layer, a sealant layer, a primer layer, or another type of layer. In other words, coating 208 can be comprised of one or multiple layers of materials.

In this illustrative example, imaging system 205 is configured to inspect coating 208 and determine whether a set of nonconformances 212 is present within coating 208. As used herein, a "set of" when used with reference to items means one or more items. For example, a set of nonconformances 212 is one or more of nonconformances 212.

The set of nonconformance 212 can take a number of different forms. For example, the set of nonconformances 212 can be at least one of a superficial crack, a delamination, a debonding, moisture, or some other type of nonconformance.

In this illustrative example, a delamination occurs when a layer splits into two layers. A debonding is present when a layer separates from another layer or a structure. For example, debonding can be present when a part of coating 208 separates from structure 204.

As depicted, imaging system 205 can include a number of different components. In this example, imaging system 205 comprises vacuum chamber 216, load generator 218, laser system 220, shearography camera system 222, infrared camera system 224, and controller 226.

Vacuum chamber 216 is a rigid physical enclosure and is configured to apply vacuum 228 to area 230 with coating 208 on structure 204. In this illustrative example, air and other gases in area 230 enclosed by vacuum chamber 216 can be removed from vacuum chamber 216 by vacuum pump 232, which is a device that removes gas molecules from area 230 enclosed by vacuum chamber 216. As depicted, vacuum 228 can be applied by vacuum chamber 216 at a level that attaches vacuum chamber 216 to surface 238 of coating 208.

As depicted, load generator 218, laser system 220, shearography camera system 222, and infrared camera system 224 can be physically connected to vacuum chamber 216. When one component is "physically connected" to another component, the connection is a physical association. For example, a first component, load generator 218, can be considered to be physically connected to a second component, vacuum chamber 216, by at least one of being secured to the second component, bonded to the second component, mounted to the second component, welded to the second component, fastened to the second component, or connected to the second component in some other suitable manner. The first component can also be connected to the second component using a third component. The first component, load generator 218, can also be considered to be physically connected to the second component, vacuum chamber 216, by being formed as part of the second component, an extension of the second component, or both.

As depicted, load generator 218 is a physical hardware system that may include software. Load generator 218 is configured to place area 230 into loaded state 240 from unloaded state 242.

In this illustrative example, load generator 218 can include one or more load generating devices that apply load 244 in a manner that places at least one of coating 208 or structure 204 in area 230 into loaded state 240 from unloaded state 242. For example, load generator 218 can include at least one of a vibration unit, a piezoelectric transducer, a capacitive transducer, a pressure chamber, a thermal source, or some other suitable load generating device.

Load 244 can increase a prominence of one or more of nonconformances 212 sufficiently to detect the presence of nonconformances 212 such as delamination or disbonding in coating 208. For example, placing area 230 into loaded state 240 from unloaded state 242 by load generator 218 can increase the prominence of a nonconformance in nonconformances 212 in coating 208.

In this example, load 244 can increase a gap in a crack in area 230 if delamination or debonding is present in the crack as compared to when the crack is superficial. The increase can make at least one of a gap crack below surface 238 of area 230 increase in size or material associated with delamination or disbonding below surface 238 of area 230 increase in displacement. This gap or displacement can increase in size such that increased heat flow can be detected for these nonconformances in subtracted thermal images from thermal imaging even when subtracted visible images from shearography do not show these nonconformances below surface 238 of coating 208. Thus, this increase in the prominence of one or more one of nonconformances 212 from placing area 230 into loaded state 240 from unloaded state 242 can be detected by imaging system 205 to more accurately determine when a nonconformance in nonconformances 212 is present and may be sufficiently severe or large to require rework.

In some illustrative examples, vacuum chamber 216 can also be considered a type of pressure chamber that applies a negative pressure in the form of vacuum 228. For example, vacuum 228 can be applied by vacuum chamber 216 at a level that attaches vacuum chamber 216 to surface 238 of coating 208 and applies load 244 coating 208.

As depicted, laser system 220 is a physical hardware system that also may include software. Laser system 220 comprises a group of lasers 234. A laser in the group of lasers 234 is a device that emits coherent light such as laser beam 236.

As used herein, a "group of" when used with reference to items means one or more items. For example, the group of lasers 234 is one or more of lasers 234.

Laser system 220 is configured to direct laser beam 236 towards surface 238 of coating 208 in area 230. Laser system 220 can scan surface 238 of coating 208 such that a stochastical interference pattern is created. This interference pattern can also be referred to as a speckle.

In this illustrative example, shearography camera system 222 is a physical hardware system that also includes software. Shearography camera system 222 comprises a group of cameras 239. In this illustrative example, the group of cameras 239 is configured to detect the interference pattern or speckle created by laser system 220 scanning surface 238 of coating 208. The group of cameras 239 can be implemented using cameras currently available for shearography imaging.

During operation, shearography camera system 222 is configured to generate unloaded visible light image 246 of area 230 in unloaded state 242 and loaded visible light image 248 of area 230 in loaded state 240, while laser beam 236 is directed towards surface 238 of coating 208.

As depicted in this example, infrared camera system 224 is a physical hardware system and may include software. Infrared camera system 224 comprises a group of infrared cameras 245. The group of infrared cameras 245 can be implemented using currently available infrared cameras that detect infrared radiation.

In this illustrative example, infrared camera system 224 is configured to detect infrared radiation and generate unloaded thermal image 252 of area 230 in unloaded state 242 and loaded thermal image 254 of area 230 in loaded state 240 from infrared radiation detected by infrared camera system 224.

For example, infrared camera system 224 can generate thermal images to detect heat flow. The heat flow can be generated from a pulse of heat applied to at least one of coating 208 or structure 204. This heat pulse can be an extreme brief heat pulse. The duration and intensity of the heat pulse can be selected to generate the heat flow in a nonconformance that can be detected by infrared camera system 224. The heat pulse can be applied using any heat source such as a flash illumination device or other suitable device. In this illustrative example, the heat pulse is not intended to apply or create load 244. This heat pulse is for purposes of detecting the heat flow in coating 208 or structure 204. In other illustrative examples, both can be selected to also apply load 244 to at least one of coating 208 or structure 204.

Further, a determination can be made as to whether any of the set of nonconformances 212 should be reworked to avoid corrosion or other undesired effects on structure 204. In this illustrative example, the determination can be made by at least one of imaging system 205 or human operator 214.

In this illustrative example, vacuum chamber 216, load generator 218, laser system 220, shearography camera system 222, and infrared camera system 224 can be connected to each other to form imaging unit 255. Imaging unit 106 in FIG. 1 is an example of a physical implementation of imaging unit 255.

In this illustrative example, controller 226 is located in computer system 256. Computer 108 in FIG. 1 is an example of a physical implementation for computer system 256. Controller 226 can be implemented in software, hardware, firmware, or a combination thereof. When software is used, the operations performed by controller 226 can be implemented in program code configured to run on hardware, such as a processor unit. When firmware is used, the operations performed by controller 226 can be implemented in program code and data and stored in persistent memory to run on a processor unit. When hardware is employed, the hardware can include circuits that operate to perform the operations in controller 226.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 256 is a physical hardware system and includes one or more data processing systems. When more than one data processing system is present in computer system 256, those data processing systems are in communication with each other using a communications medium. The communications medium can be a network. The data processing systems can be selected from at least one of a computer, a server computer, a tablet computer, or some other suitable data processing system.

As depicted, controller 226 is configured to receive unloaded visible light image 246, loaded visible light image 248, unloaded thermal image 252, and loaded thermal image 254. Controller 226 is configured to subtract loaded visible light image 248 from unloaded visible light image 246 to form subtracted visible light image 258 and subtract loaded thermal image 254 from unloaded thermal image 252 to form subtracted thermal image 260.

In this illustrative example, the subtraction of images to form subtracted images, such as subtracted visible light image 258 and subtracted thermal image 260, can be performed in a number of different ways using currently available techniques. For example, a thresholding process can be used in which the images are reduced to a smaller number of bits. For example, the image can be reduced to a two-bit image. The two-bit images can be superimposed on top of each other pixel by pixels. In this case, two images have the same number of rows and columns.

In one example, the images are binary images. When a pixel in the unloaded image corresponding to the pixel in the loaded image has a different value, the pixel for the subtracted image is to be assigned a higher value as compared to when the two pixels do not differ in value.

When the pixel values in the images are not binary, the result of subtraction of values in the pixels may not yield a clear-cut black and white answer for assigning values to the pixels in the subtracted image. In this case, a threshold can be applied to generate a mask image. The mask image may have high intensity areas that can be segmented out using a segmentation algorithm, such as region growing. Other subtraction techniques can be used depending on the implementation. These techniques can also employ image processing routines, vision processing routines, or some combination thereof that can perform background subtraction.

In the illustrative example, controller 226 can be configured to display at least one of subtracted visible light image 258 or subtracted thermal image 260 on display system 262. In this depicted example, display system 262 is a physical hardware system and includes one or more display devices on which graphical user interface 264 can be displayed. The display devices may include at least one of a light emitting diode (LED) display, a liquid crystal display (LCD), an organic light emitting diode (OLED) display, a computer monitor, a projector, a flat panel display, a heads-up display (HUD, or some other suitable device that can output information for the presentation of information.

Additionally, imaging system 205 can also include visible light camera system 272, which generates image 274 of surface 238 of coating 208 on structure 204. When image 274 is generated, controller 226 can be configured to superimpose at least one of subtracted visible light image 258 or subtracted thermal image 260 on image 274 of surface 238.

As depicted, display system 262 is configured to display graphical user interface 264. For example, controller 226 can display at least one of subtracted visible light image 258 or subtracted thermal image 260 in graphical user interface 264. As another example, controller 226 can also display at least one of unloaded visible light image 246, loaded visible light image 248, unloaded thermal image 252, or loaded thermal image 254 in graphical user interface 264 to human operator 214.

In this illustrative example, graphical user interface 264 can be a tool used by human operator 214 to perform a visual inspection of area 230 to determine whether the set of nonconformances 212 is present in coating 208 in area 230. In other words, human operator 214 can analyze at least one of subtracted visible light image 258 or subtracted thermal image 260 displayed on graphical user interface 264 to determine whether a set of nonconformances 212 is present in coating 208. Further, human operator 214 can determine whether a nonconformance in the set of nonconformances 212 should be reworked.

Further, human operator 214 is a person who can interact with graphical user interface 264 through user input 266 generated by human operator 214 manipulating input system 268 for computer system 256. As depicted, input system 268 is a physical hardware system and can be selected from at least one of a mouse, a keyboard, a trackball, a touchscreen, a stylus, a motion sensing input device, a cyber glove, or some other suitable type of input device.

In this depicted example, human operator 214 can generate user input 266 to perform action 270 on graphical user interface 264. Action 270 can include at least one of marking a graphical indication of the set of nonconformances 212 on at least one of subtracted visible light image 258 or subtracted thermal image 260 displayed in graphical user interface 264, generating a work order for reworking area 230, logging a presence of the set of nonconformances 212 in a log, entering information about the set of nonconformances 212, or other suitable actions. In this depicted example, graphical indication of the set of nonconformances 212 can be a graphical indicator that identifies at least one of a location of the set of nonconformances 212, dimensions of the set of nonconformances 212, or other suitable graphical indications.

In another illustrative example, the analysis of subtracted visible light image 258 and subtracted thermal image 260 can be performed by controller 226. This analysis can be performed without needing input from human operator 214.

As depicted, at least one of subtracted visible light image 258 or subtracted thermal image 260 can be analyzed by controller 226 using artificial intelligence system 276 to determine whether a set of nonconformances 212 is present in coating 208 that require rework.

Artificial intelligence system 276 is a system that has intelligent behavior and can be based on the function of a human brain. An artificial intelligence system comprises at least one of an artificial neural network, a cognitive system, a Bayesian network, fuzzy logic, an expert system, a natural language system, or some other suitable system. Machine learning is used to train artificial intelligence system 276. Machine learning involves inputting data to the process and allowing the process to adjust and improve the function of the artificial intelligence system 276.

A cognitive system is a computing system that mimics the function of the human brain. The cognitive system can be, for example, IBM Watson available from International Business Machines Corporation.

Figure 3:
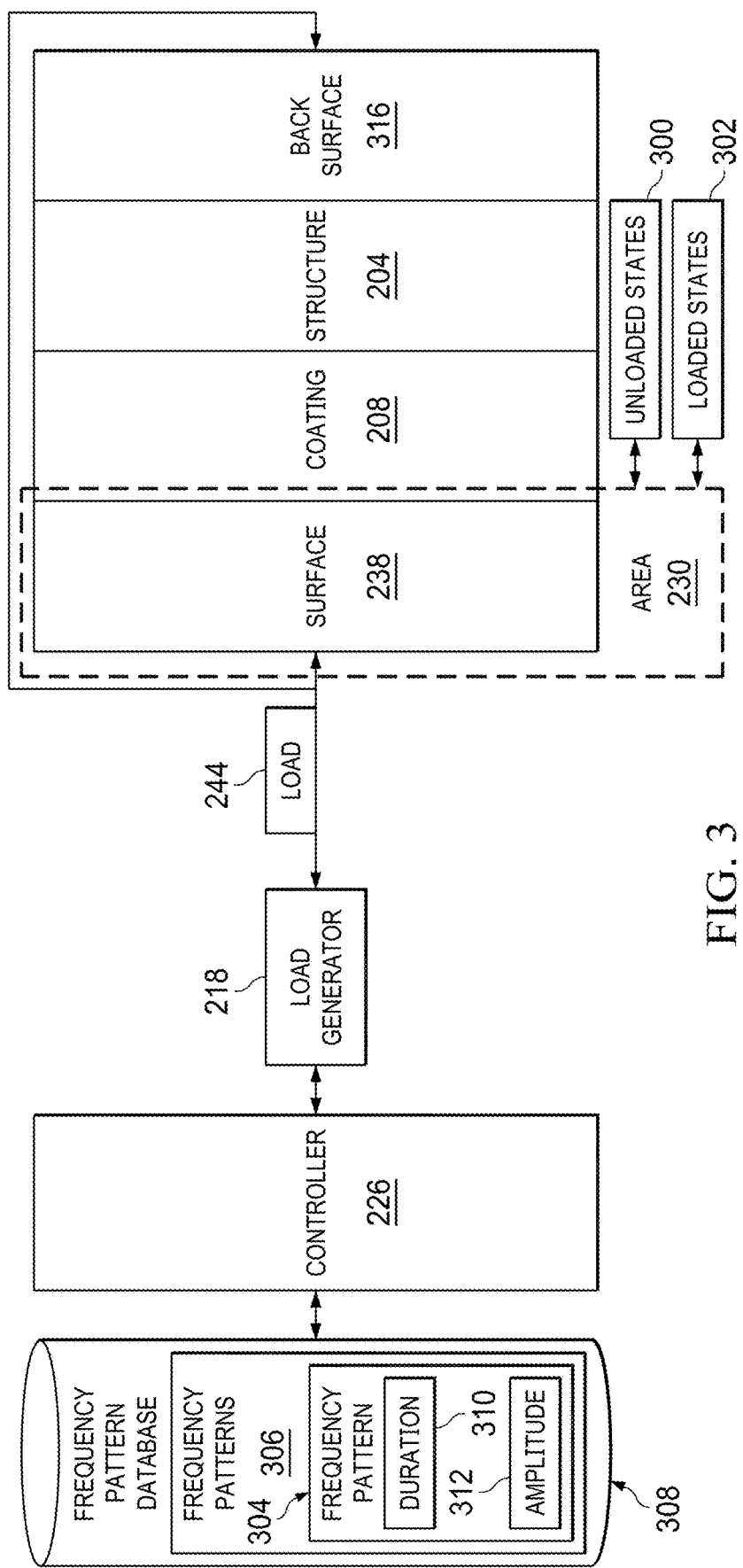
FIG. 3 is an illustration of a block diagram depicting an application of a load to a coating in accordance with an illustrative embodiment.

With reference next FIG. 3, an illustration of a block diagram depicting an application of a load to a coating is depicted in accordance with an illustrative embodiment. In the illustrative examples, the same reference numeral may be used in more than one figure. This reuse of a reference numeral in different figures represents the same element in the different figures.

As depicted, in controlling load generator 218 to place coating 208 into loaded state 240 from unloaded state 242, controller 226 is also configured to control the operation of load generator 218 to place coating 208 back into unloaded state 242 from loaded state 240.

In this illustrative example, controller 226 is configured to control the operation of load generator 218 and cause load generator 218 to place area 230 on structure 204 into alternating unloaded states 300 and loaded states 302 with frequency pattern 304.

Typically, frequency pattern 304 can be selected from frequency patterns 306 in frequency pattern database 308. For example, frequency pattern 304 can define duration 310 of load 244 placed on structure 204 by load generator 218. In this example, frequency pattern 304 for duration 210 of load 244 includes at least one of a constant frequency, a glide sweep, a stepped sweep, or some other suitable pattern.

In another example, frequency pattern 304 defines amplitude 312 of load 244 placed on structure 204 by load generator 218. With this example, frequency pattern 304 for amplitude 312 of load 244 includes at least one of a constant frequency, a glide sweep, a stepped sweep, or some other suitable pattern.

In this illustrative example, frequency pattern 304 can define at least one of duration 310 of load 244 or amplitude 312 of load 244 applied to structure 204. In other words, one of or both of duration 310 and amplitude 312 can change based on frequency pattern 304 selected from frequency patterns 306 in frequency pattern database 308.

Further, load 244 can be applied in a number of different ways in addition to using frequency pattern 304. For example, load 244 can be applied to a group of locations. The group of locations can be at least one of surface 238 of coating 208 or back surface 316 of structure 204. As depicted, back surface 316 of structure 204 is on a surface that is opposite to surface 238 of coating 208. With this application of load 244 to back surface 316 of structure 204, load 244 is applied indirectly to coating 208 through structure 204. If load 244 is applied to both surface 238 of coating 208 or back surface 316 of structure 204, load 244 can take a number of different forms. For example, load 244 applied to surface 238 of coating 208 can be a physical load, and load 244 applied to back surface 316 of structure 204 can be a thermal load.

The selection of frequency pattern 304 can be performed in a number of different ways. For example, frequency pattern 304 can be changed during the generation of images to identify frequency pattern 304 that works best for coating 208 on structure 204.

For example, frequency pattern 304 can be selected as one that provides the greatest increase or exaggerate a nonconformance. This increase can, for example, increase debonding or delamination. The amount of debonding or delamination can be determined based on the results from subtracted images.

Further, frequency pattern 304 can be selected as one that is a resonance frequency for a nonconformance. For example, applying load 244 using frequency pattern 304 can cause vibrations to find the resonance frequency of a crack that may have delamination or debonding.

In the illustrative example, applying load 244 to place area 230 on structure 204 into alternating ones of unloaded states 300 and loaded states 302 with frequency pattern 304 can be performed in a number of different ways. For example, load 244 can be applied with frequency pattern 304 such that area 230 enters a loaded state and is in the loaded state while load 244 is applied using frequency pattern 304. When load 244 is removed, area 230 returns to an unloaded state. In this manner, load 244 can be applied to place area 230 into alternating ones of unloaded states 300 and loaded states 302 with frequency pattern 304.

In another illustrative example, load 244 can be applied to area 230 to place area 230 into alternating ones of unloaded states 300 and loaded states 302 with frequency pattern 304 in which load 244 is applied as a pulse with a duration to place area 230 into the loaded state. After the pulse has ended, area 230 returns to the unloaded state prior to load 244 being applied to area 230. This application and removal of load 244 in pulses occurs with frequency pattern 304 such that area 230 alternates unloaded states 300 and loaded states 302 with frequency pattern 304.

In one illustrative example, one or more technical solutions are present that overcome a technical problem with detecting nonconformances that require reworking of a coating. As a result, one or more technical solutions can provide a technical effect of generating images that can be analyzed to determine whether nonconformances are present that require rework of a coating on a structure of an object.

Thus, computer system 256 can be configured to perform at least one of the steps, operations, or actions described in the different illustrative examples using software, hardware, firmware, or a combination thereof. As a result, computer system 256 operates as a special purpose computer system in which controller 226 in computer system 256 enables at least one of generating images or determining whether noncoformances are present in coatings of objects being inspected. In particular, controller 226 transforms computer system 256 into a special purpose computer system as compared to currently available general computer systems that do not have controller 226.

In the illustrative example, the use of controller 226 in computer system 256 integrates processes into a practical application for detecting nonconformances in a coating that increases the performance of computer system 256. In other words, controller 226 in computer system 256 is directed to a practical application of processes integrated into controller 226 in computer system 256 that controls components to generate images of a coating from shearography camera system 222 and infrared camera system 224. These images are taken while coating 208 is in unloaded state 242 and loaded state 240. Controller 226 receives these images and subtracts images in loaded state 240 from images in unloaded state 242 to generate subtracted images. The subtracted images can be used to determine whether a nonconformance is present in the coating for which rework should be performed. These types of images are not generated by current techniques implemented in computer systems that do not include controller 226.

The illustration of inspection environment 200 and the different components in inspection environment 200 in FIGS. 1-3 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, vacuum chamber 216 is an optional component in imaging system 205 and can be omitted in some illustrative examples. A platform such as a housing or frame can be used to hold components such as load generator 218, laser system 220, shearography camera system 222, and infrared camera system 224. In another example, laser system 220 can generate one or more laser beams in addition to laser beam 236.

Figure 4:
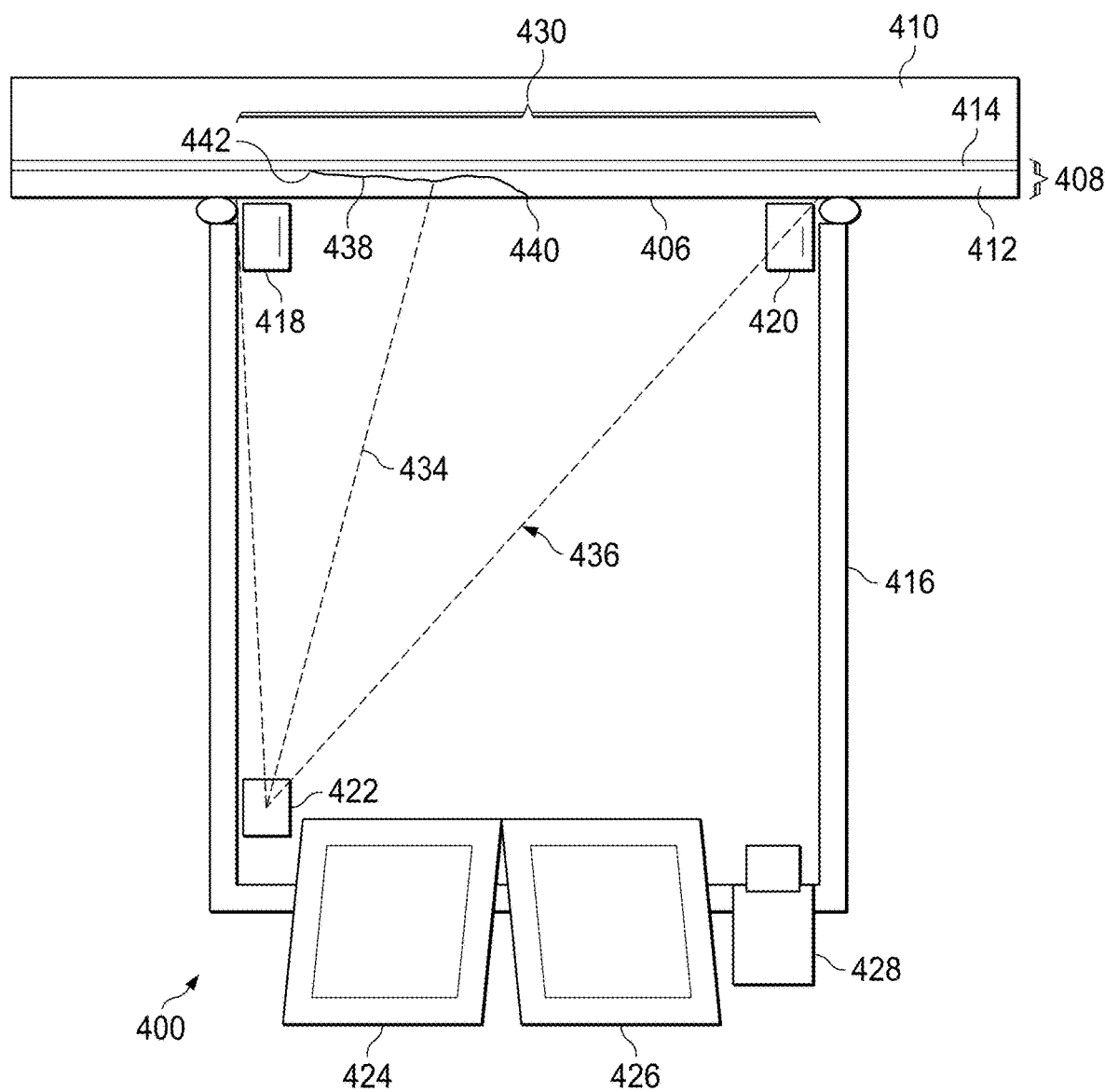
FIG. 4 is an illustration of a nondestructive inspection system in accordance with an illustrative embodiment.

With reference now to FIG. 4, an illustration of an imaging unit depicted in accordance with an illustrative embodiment. In this illustrative example, imaging unit 400 is an example of an implementation for imaging system 205 shown in block form in FIG. 2. As depicted, imaging unit 400 is an example of a physical implementation of imaging unit 255 shown in block form in FIG. 2.

In this illustrative example, a cross-sectional view of imaging unit 400 is depicted on surface 406 on coating 408 on metal skin panel 410. As depicted, coating 408 comprises paint layer 412 and primer layer 414. Coating 408 is an example of a physical implementation for coating 208 shown in block form in FIG. 2.

Imaging unit 400 comprises vacuum chamber 416, vibration unit 418, vibration unit 420, laser 422, shearography camera 424, infrared camera 426, and visual camera 428. In this illustrative example, vacuum chamber 416 provides a platform for vibration unit 418, vibration unit 420, laser 422, shearography camera 424, infrared camera 426, and visual camera 428 in addition to applying a vacuum.

As depicted, vacuum chamber 416 applies a vacuum when placed on area 430 on surface 406 of coating 408. In this illustrative example, area 430 is defined as the region or area encompassed by vacuum chamber 416. As depicted, the vacuum connects vacuum chamber 416 to surface 406 of coating 408 to attach imaging unit 402 to surface 406 in area 430.

In this illustrative example, laser 422 emits laser beam 434 to scan area 430 as indicated by laser light region 436. Laser beam 434 scans area 430 to create laser light region 436 for use by shearography camera 424 to visible light images.

Further, vibration unit 418 and vibration unit 420 can apply a load to coating 408 in area 430. These operations can be, for example, piezoelectric transducers.

In this illustrative example, these vibration units generate a load using vibrations that places coating 408 into a loaded state from an unloaded state. In other illustrative examples, these vibration units can place coating 408 into a loaded state and an unloaded state in an alternating manner. The manner in which coating 408 is placed into a loaded state and an unloaded state can be based on the frequency pattern in which at least one of a duration of the load or an amplitude of the load changes on some selected pattern.

As depicted, shearography camera 424 and infrared camera 426 can generate images of coating 408 while coating 408 is in an unloaded state. These images include an unloaded visible light image and an unloaded thermal image. These images are reference images that can be used for comparison with images and the loaded state. These images are generated while laser 422 scans surface 406 of coating 408 using laser beam 434, and while a load has not yet been placed on coating 408.

Shearography camera 424 and infrared camera 426 can generate images after coating 408 has been placed into a loaded state and while laser 422 continues to scan surface 406 using laser the 434. Thus, shearography camera 424 generates a set of one or more loaded visible light images, and infrared camera 426 generates a set of one or more loaded thermal images. These images can be analyzed to determine whether a nonconformance is present in coating 408 in area 430. Further, a determination is made as to whether the nonconformance is such that reworking of coating 408 in area 430 should be performed.

In this example, crack 438 is present in paint layer 412. The analysis of the images can indicate the presence of crack 438. For example, a subtracted image generated by subtracting a loaded visible light image from an unloaded visible light image can visibly indicate the presence of crack 438 at surface 406 in location 440. The extent of crack 438 can be determined using a subtracted thermal image generated by subtracting a loaded thermal image from an unloaded thermal image. The extent of crack 438 can be identified in this image through the heat flow that can occur through crack 438 from location 440 to location 442. Further, moisture present within crack 438 can also be identified in the subtracted thermal image.

In the illustrative example, the load applied by imaging unit 400 allows for the visualization of nonconformances that may not be seen in images generated by other imaging techniques. The load applied by imaging unit 400 exaggerates or increases the extent the nonconformance. For example, the load applied by vibration unit 418 and vibration unit 420 can increase a gap in crack 438 if delamination or debonding is present in crack 438 as compared to when the crack 438 is superficial. Further, vacuum chamber 416 can also apply a vacuum at a level that also places a load on coating 408 in addition to attaching vacuum chamber 416 to surface 406 of coating 408. In this manner, vacuum chamber 416 can provide loading on coating 408 in addition to or in place of vibration unit 418 and vibration unit 420.

In the illustrative example, increased heat flow into the gap in crack 438 when debonding or delamination is present as compared to when debonding or delamination is absent in crack 438. This increased amount of heat can be detected using subtracted thermal images generated by infrared camera 426 in imaging unit 400.

Visual camera 428 is an example of a camera that can be used to implement visible light camera system 272 in FIG.

2. Visual camera 428 operates to generate an image of surface 406. The subtracted images can be overlaid on the visual image to provide a better visualization of surface 406 at location 430.

Thus, infrared camera 426 can be used to detect nonconformances that require reworking from the heat flow detected in subtracted thermal images in addition to detecting moisture that may be present in crack 438. In the illustrative example, vacuum chamber 416 can also apply a vacuum at a level that also places a load on coating 408 in addition to attaching vacuum chamber 416 to surface 406 of coating 408. In this manner, vacuum chamber 416 can provide loading on coating 408 in addition to or in place of vibration unit 418 and vibration unit 420. Current techniques for thermal imaging do not apply loads to increase or exaggerate nonconformances as depicted in the illustrative examples.

With reference next to FIG. 5, an illustration of a cross-section of a structure with a coating with nonconformances in an unloaded state is depicted in accordance with an illustrative embodiment. In this illustrative example, coating 500 is located on metal skin panel 502. Coating 500 comprises paint layer 504 and primer layer 506.

In this example, nonconformances are present in the form of crack 508 in primer layer 506 and crack 510 in paint layer 504. As depicted, moisture 512 and moisture 514 are present in these nonconformances. In the unloaded state, crack 510 may be apparent while crack 508 may not be apparent from images generated of this area.

Turning to FIG. 6, an illustration of a cross-section of a structure with a coating with nonconformances in a loaded state is depicted in accordance with an illustrative embodiment. In this figure, a load has been applied to coating 500 to place coating 500 into a loaded state from an unloaded state. This load can be generated by a system such as imaging system 205 in FIG. 2 using load generation devices such as vibration unit 418 and vibration unit 420 in imaging unit 400 in FIG. 4.

Vibrations can be generated by these devices that place coating 500 and metal skin panel 502 into the loaded state to increase displacement 600 of primer layer 506 in crack 508. With displacement 600, debonding of primer layer 506 from metal skin panel 502 is more apparent in both subtracted visible light images and subtracted thermal images. The vibrations can generate a displacement in paint layer 504 even though crack 508 is not apparent through a normal visual inspection. In other words, crack 508 may not be seen without loading of crack 508.

The extent of the debonding in crack 508 can be detected in subtracted thermal images that show at least one of heat flow or moisture 512. In this illustrative example, subtracted thermal images can indicate that moisture 512 is present in the location with respect to metal skin panel 502 in which moisture 512 can cause corrosion in metal skin panel 502.

In this illustrative example, displacement 602 of paint layer 504 and crack 510 can be detected in subtracted visible light images and subtracted thermal images. A determination can be made that this crack is superficial and does not require rework. As depicted, moisture 514 is in a location that does not present a risk for corrosion in metal skin panel 502.

Figure 7:
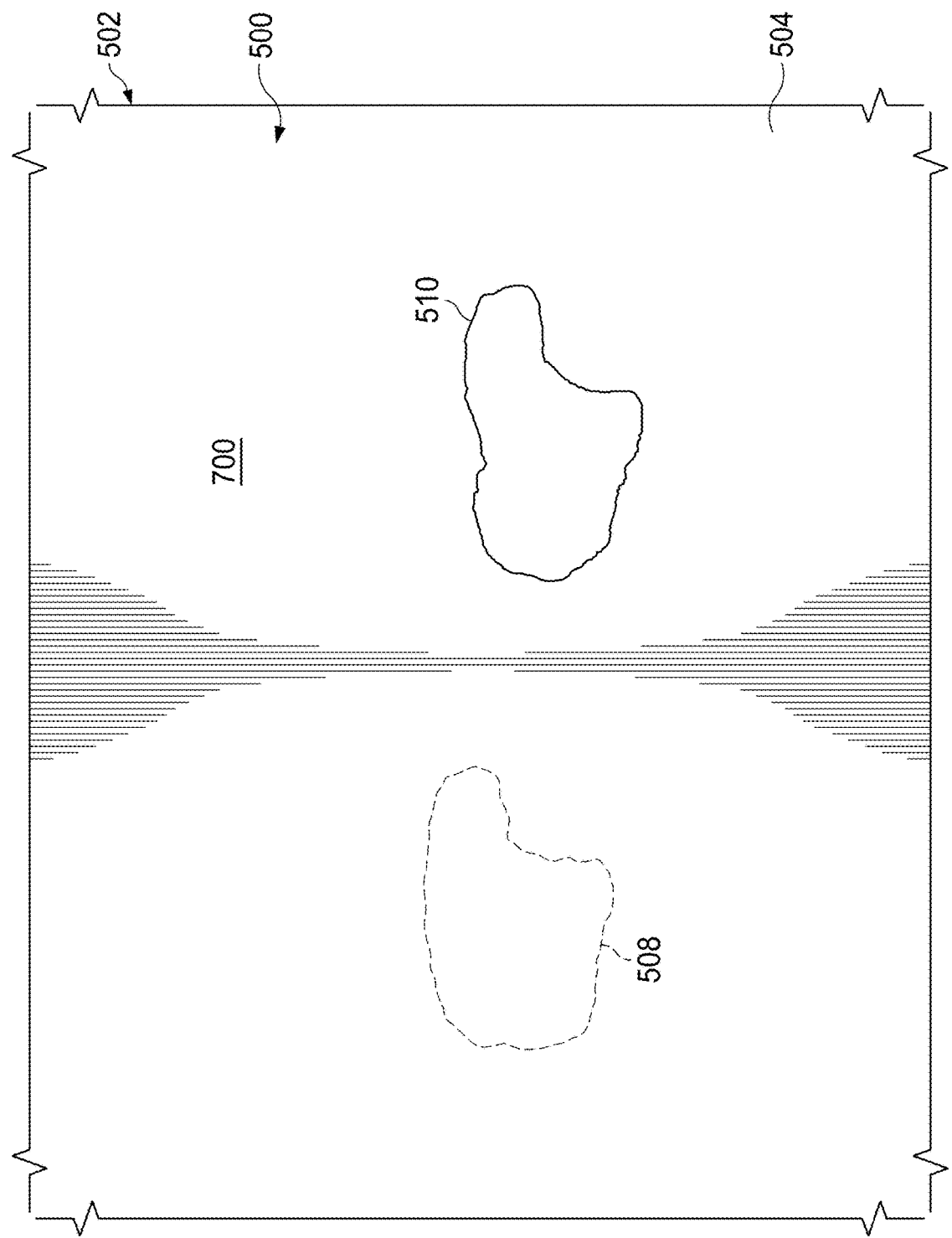
FIG. 7 is an illustration of a top view of a coating on a metal skin panel in accordance with an illustrative embodiment.

With reference next to FIG. 7, an illustration of a top view of a coating on a metal skin panel is depicted in accordance with an illustrative embodiment. In this top view, coating 500 and metal skin panel 502 are in an unloaded state. Crack 508 and crack 510 are present in this top view of coating 500 on metal skin panel 502. Crack 508 is shown using a dashed line because crack 508 is not apparent from surface 700 of paint layer 504 in coating 500. FIGS. 8-13 are examples of images generated of the top view of coating 500 in FIG. 7.

Figure 8:
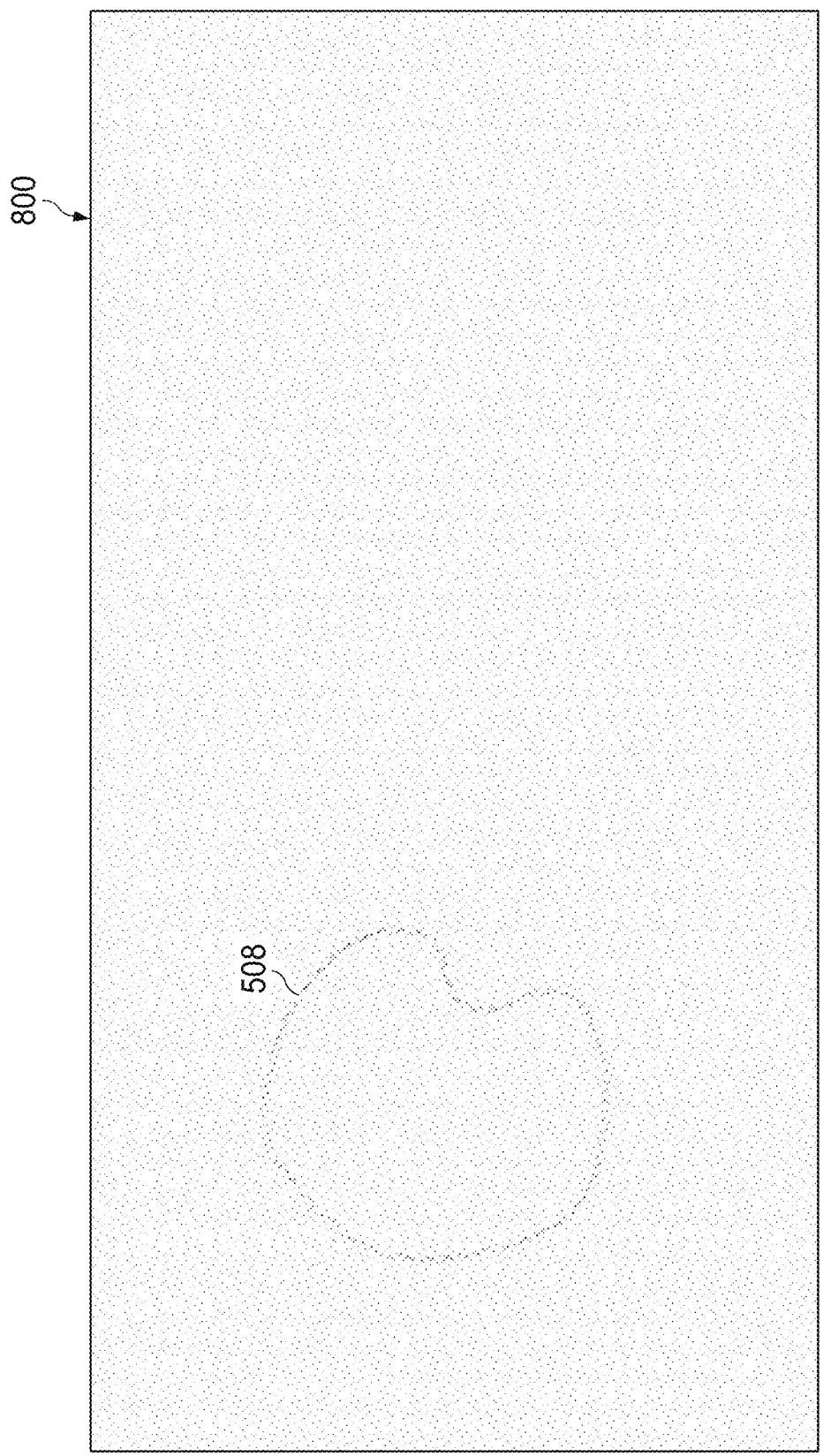
FIG. 8 is an illustration of an unloaded visual image of a coating in an unloaded state in accordance with an illustrative embodiment.

In FIG. 8, an illustration of an unloaded visual image of a coating in an unloaded state is depicted in accordance with an illustrative embodiment. Unloaded visual image 800 is an image of surface 700 of coating 500 in the unloaded state in FIG. 7. Unloaded visual image 800 can be generated using shearography camera system 222 in FIG. 2 while coating 500 is in an unloaded state. This image can be used as a reference image. As depicted, crack 508 can be seen in unloaded visual image 800, while crack 510 is not visible in this image.

Figure 9:
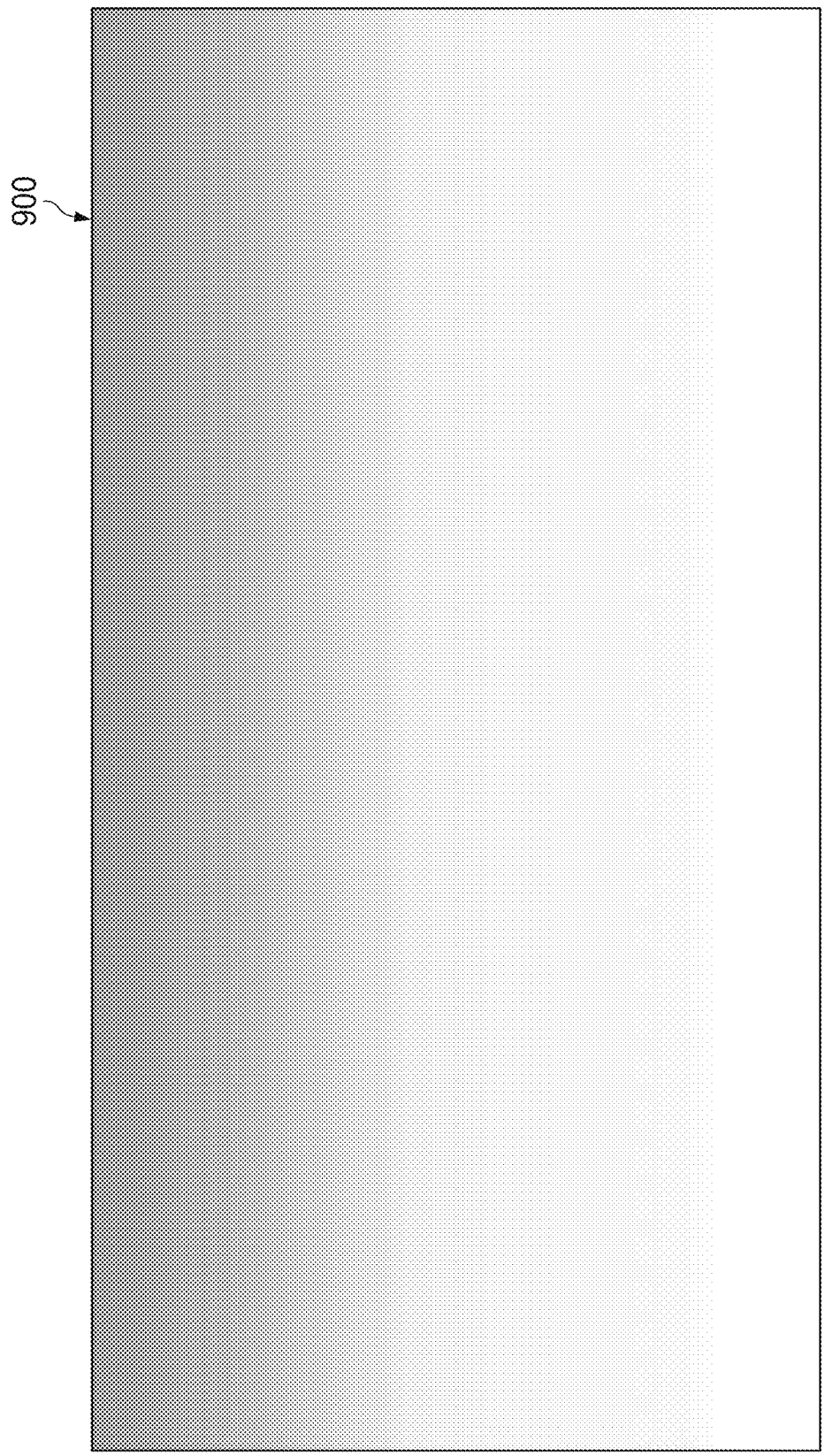
FIG. 9 is an illustration of an unloaded thermal image of a coating in an unloaded state in accordance with an illustrative embodiment.

With reference next to FIG. 9, an illustration of an unloaded thermal image of a coating in an unloaded state is depicted in accordance with an illustrative embodiment. Unloaded thermal image 900 is an image of surface 700 of coating 500 in the unloaded state in FIG. 7. Unloaded thermal image 900 can be generated using infrared camera system 224 in FIG. 2 while coating 500 is in the unloaded state. Neither crack 508 nor crack 510 are visible in this image.

Figure 10:
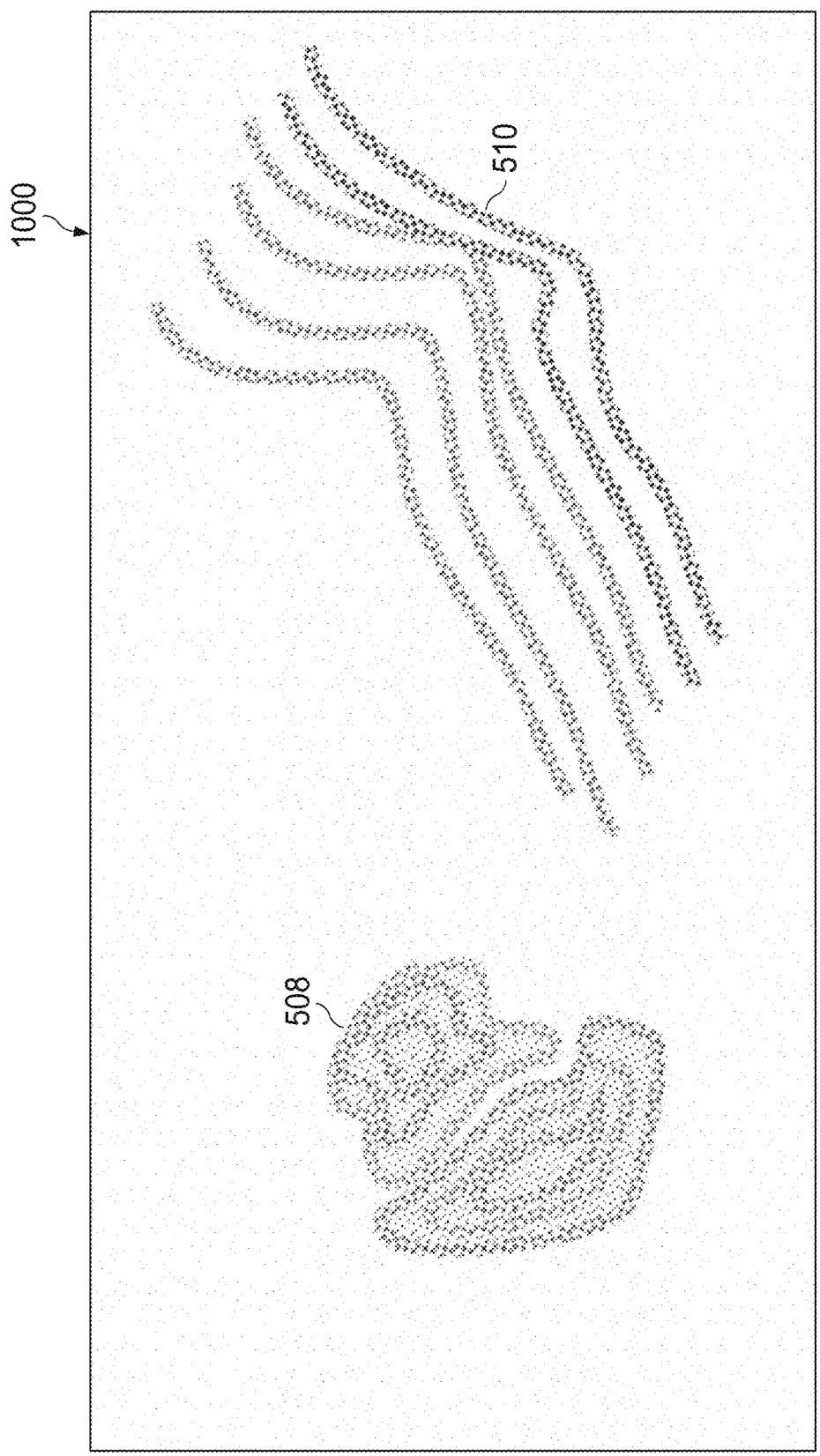
FIG. 10 is an illustration of a loaded visual image of a coating in a loaded state in accordance with an illustrative embodiment.

Turning next to FIG. 10, an illustration of a loaded visual image of a coating in a loaded state is depicted in accordance with an illustrative embodiment. Loaded visual image 1000 is an image of coating 500 in the loaded state in FIG. 7. Loaded visual image 1000 can be generated using shearography camera system 222 in FIG. 2 while coating 500 is in a loaded state. In this figure, crack 508 and crack 510 are visible in loaded visual image 1000.

Figure 11:
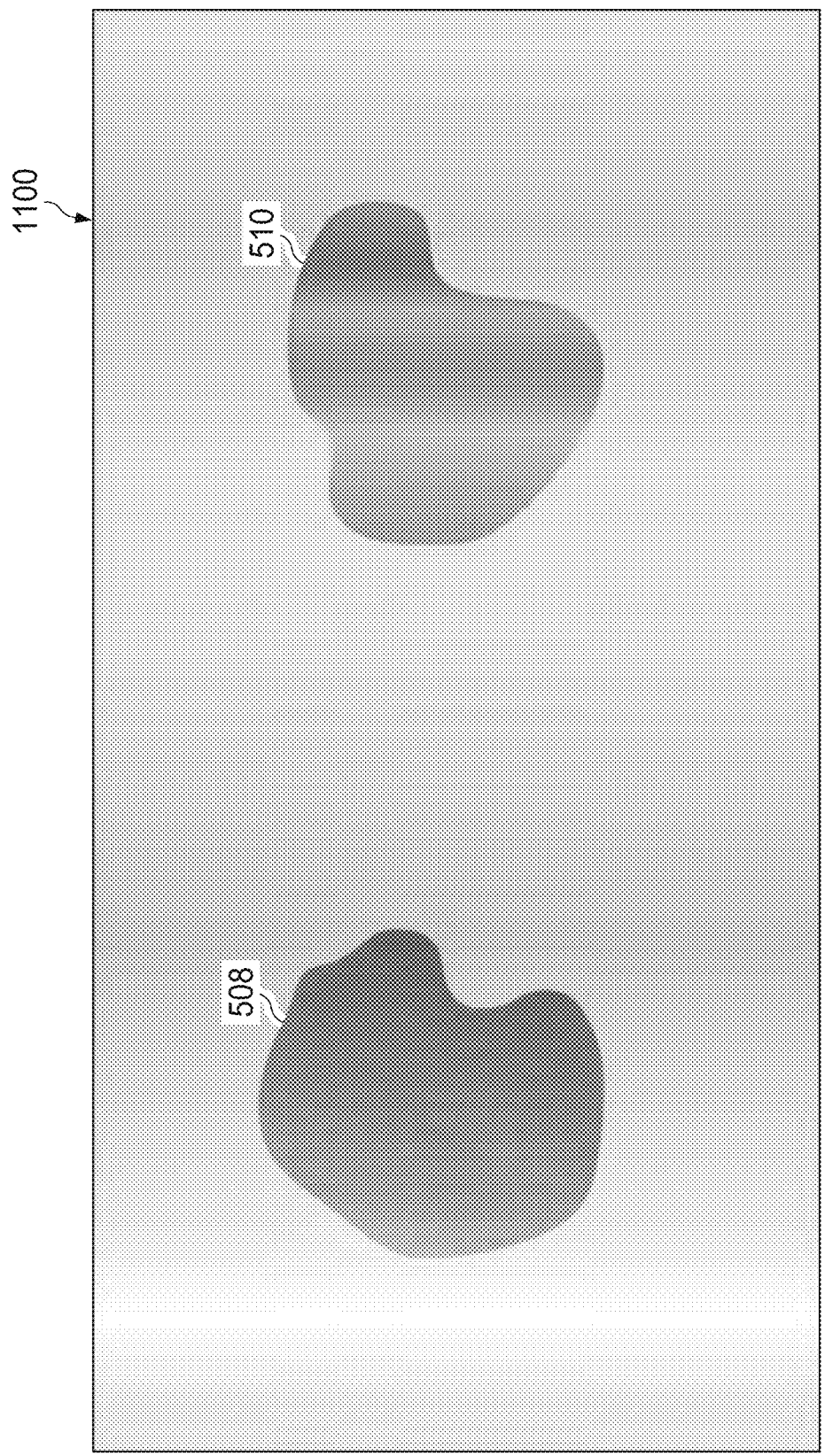
FIG. 11 is an illustration of a loaded thermal image of a coating in a loaded state in accordance with an illustrative embodiment.

With reference next to FIG. 11, an illustration of a loaded thermal image of a coating in a loaded state is depicted in accordance with an illustrative embodiment. Loaded thermal image 1100 is an image of coating 500 in the loaded state in FIG. 7. Loaded thermal image 1100 can be generated using infrared camera system 224 in FIG. 2 while coating 500 is in the loaded state. In the loaded state, the displacement of coating 500 in crack 510 can increase or become more exaggerated allowing for more heat flow through crack 510. As depicted, in this image, crack 508 is not as visible as crack 510 in loaded thermal image 1100. The increased visibility of crack 510 as compared to crack 508 can occur because of the detection of at least one of increased moisture or heat flow through crack 510 as compared to crack 508.

Figure 12:
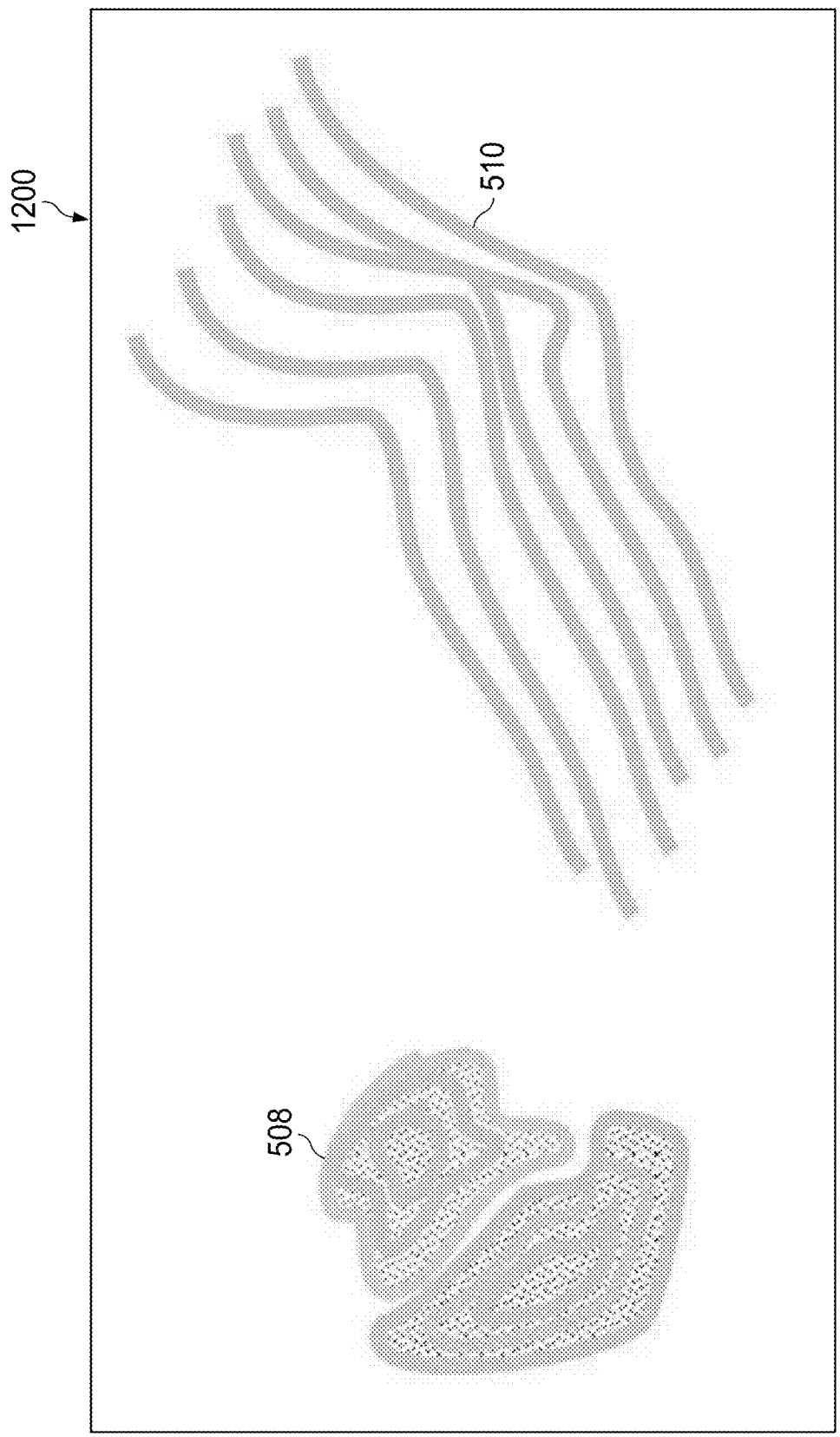
FIG. 12 is an illustration of a subtracted visual image of a coating in accordance with an illustrative embodiment.

With reference to FIG. 12, an illustration of a subtracted visual image of a coating is depicted in accordance with an illustrative embodiment. Subtracted visual image 1200 is an image generated by subtracting loaded visual image 1000 in FIG. 10 from unloaded visual image 800 in FIG. 8. In this image, crack 508 and crack 510 can be seen. The visualizations of these cracks are what is detected at or near surface 700 of coating 500 in FIG. 7.

Figure 13:
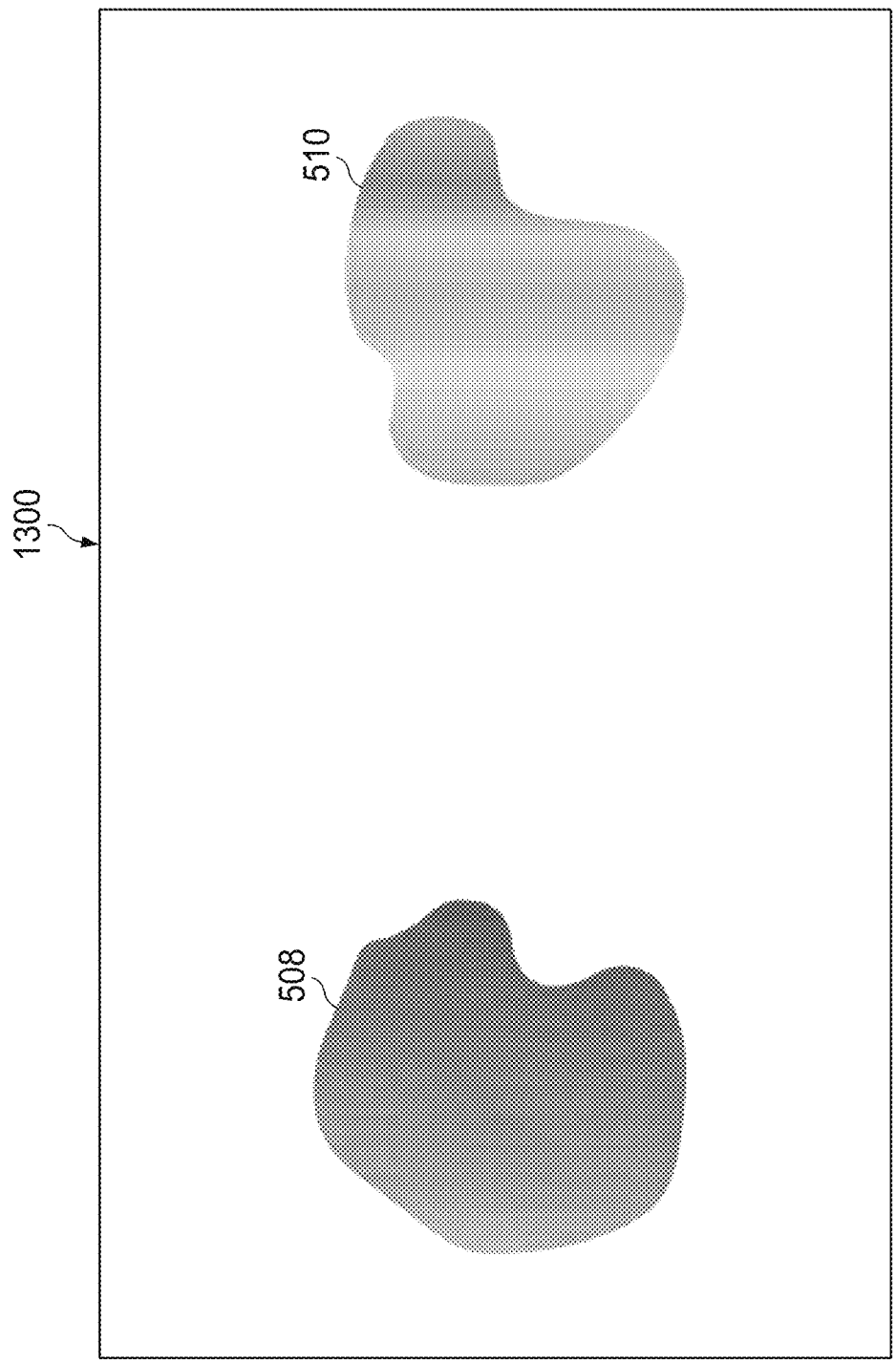
FIG. 13 is an illustration of a subtracted thermal image of a coating in accordance with an illustrative embodiment.

With reference next to FIG. 13, an illustration of a subtracted thermal image of a coating is depicted in accordance with an illustrative embodiment. Subtracted thermal image 1300 is an image generated by subtracting loaded thermal image 1100 in FIG. 11 from unloaded thermal image 900 in FIG. 9.

Subtracted thermal image 1300 indicates heat flow that is deeper within coating 500 rather than near surface 700 of coating 500 in FIG. 7. In this illustrative example, subtracted visual image 1200 and subtracted thermal image 1300 indicate that crack 510 is a deeper crack as compared to crack 508. Further, the heat flow detected in subtracted thermal image 1300 initiates that at least one of a delamination or debonding is present in coating 500. As a result, reworking of crack 510 may be needed. In contrast, crack 508 is a less severe crack that may not need to be reworked.

Figure 14:
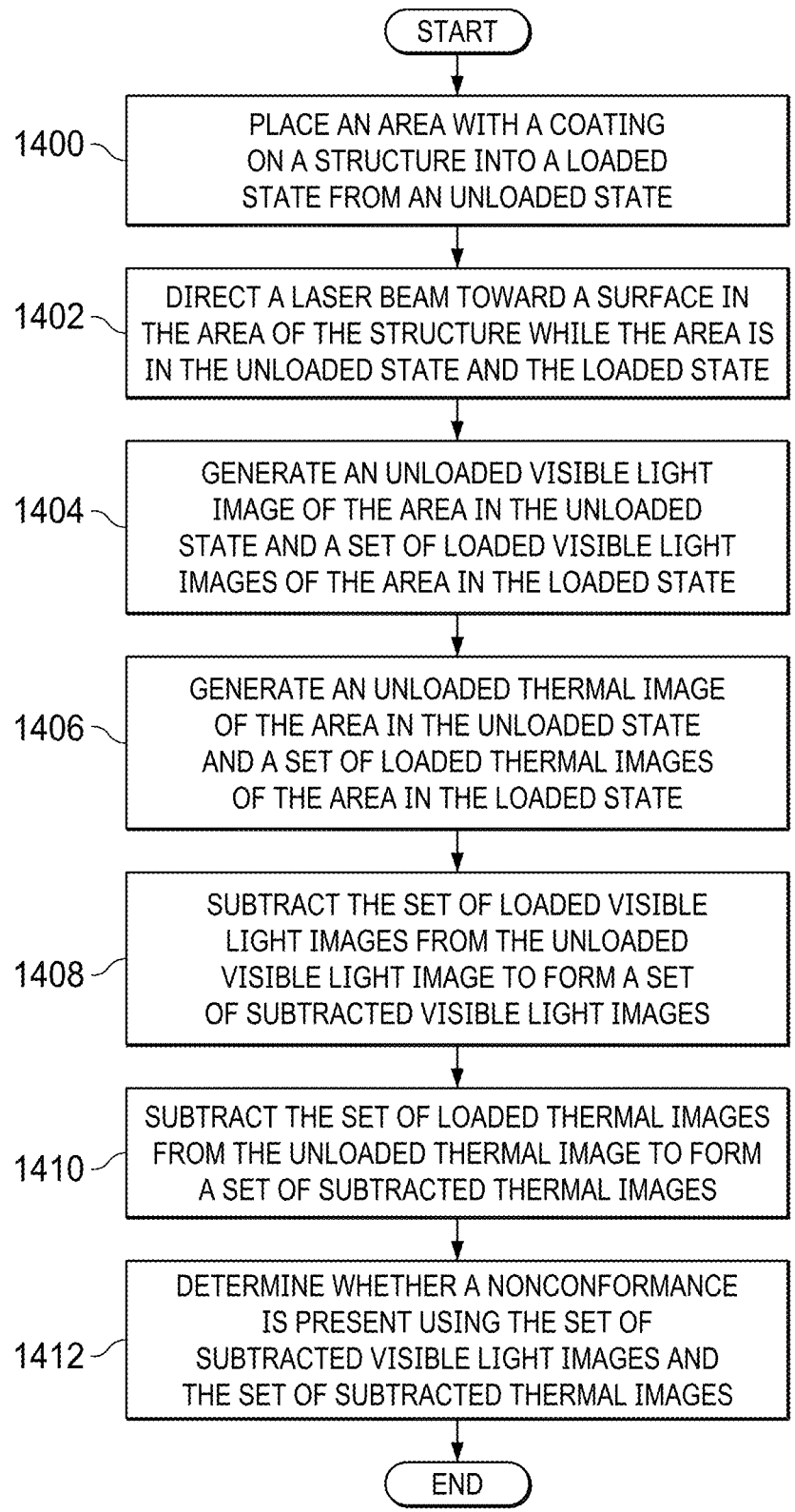
FIG. 14 is an illustration of a flowchart of a process for detecting nonconformances in accordance with an illustrative embodiment.

Turning next to FIG. 14, an illustration of a flowchart of a process for detecting nonconformances is depicted in accordance with an illustrative embodiment. The process in FIG. 14 can be implemented in hardware, software, or both. When implemented in software, the process can take the form of program code that is run by one or more processor units located in one or more hardware devices in one or more computer systems. For example, the process can be implemented in controller 226 in computer system 256 in FIG. 2.

The process beings by placing an area with a coating on a structure into a loaded state from an unloaded state (operation 1400). The process directs a laser beam toward a surface in the area of the structure while the area is in the unloaded state and the loaded state (operation 1402).

The process generates an unloaded visible light image of the area in the unloaded state and a set of loaded visible light images of the area in the loaded state (operation 1404). The process generates an unloaded thermal image of the area in the unloaded state and a set of loaded thermal images of the area in the loaded state (operation 1406). In this illustrative example, the images generated in the unloaded state are reference images from which the images in the loaded state are subtracted.

The process subtracts the set of loaded visible light images from the unloaded visible light image to form a set of subtracted visible light images (operation 1408). The process subtracts the set of loaded thermal images from the unloaded thermal image to form a set of subtracted thermal images (operation 1410).

The process determines whether a nonconformance is present using the set of subtracted visible light images and the set of subtracted thermal images (operation 1412). The process terminates thereafter.

Figure 15:
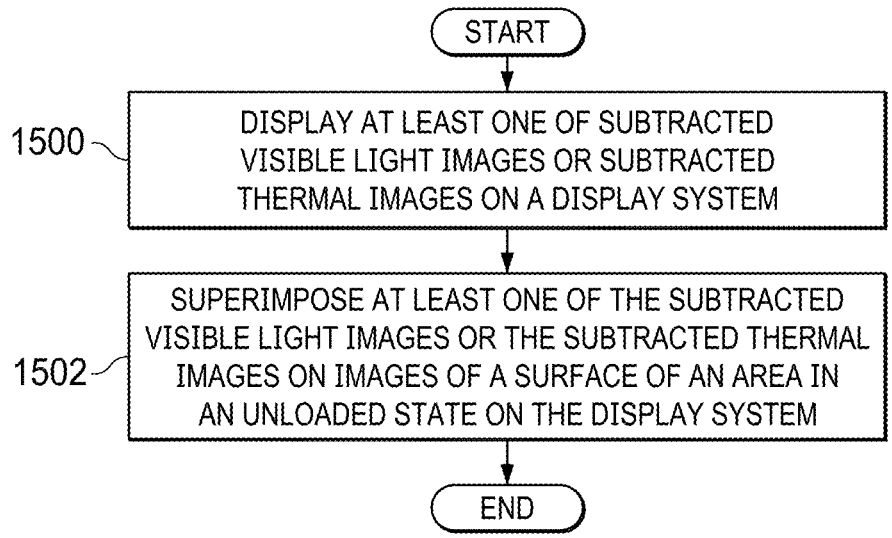
FIG. 15 is an illustration of a flowchart of a process for displaying subtracted images for detecting nonconformances in accordance with an illustrative embodiment.

Turning now to FIG. 15, an illustration of a flowchart of a process for displaying subtracted images for detecting nonconformances is depicted in accordance with an illustrative embodiment. The process in FIG. 15 can be implemented in hardware, software, or both. When implemented in software, the process can take the form of program code that is run by one or more processor units located in one or more hardware devices in one or more computer systems. For example, the process can be implemented in controller 226 in computer system 256 in FIG. 2.

The process begins by displaying at least one of subtracted visible light images or subtracted thermal images on a display system (operation 1500). The process superimposes at least one of the subtracted visible light images or the subtracted thermal images on images of a surface of an area in an unloaded state on the display system (operation 1502). The process terminates thereafter.

The process of displaying at least one of the subtracted visible light images or the subtracted thermal images in this flowchart can provide an indication of a set of nonconformances in a coating. The set of nonconformances can be at least one of a delamination, a debonding, or moisture.

Figure 16:
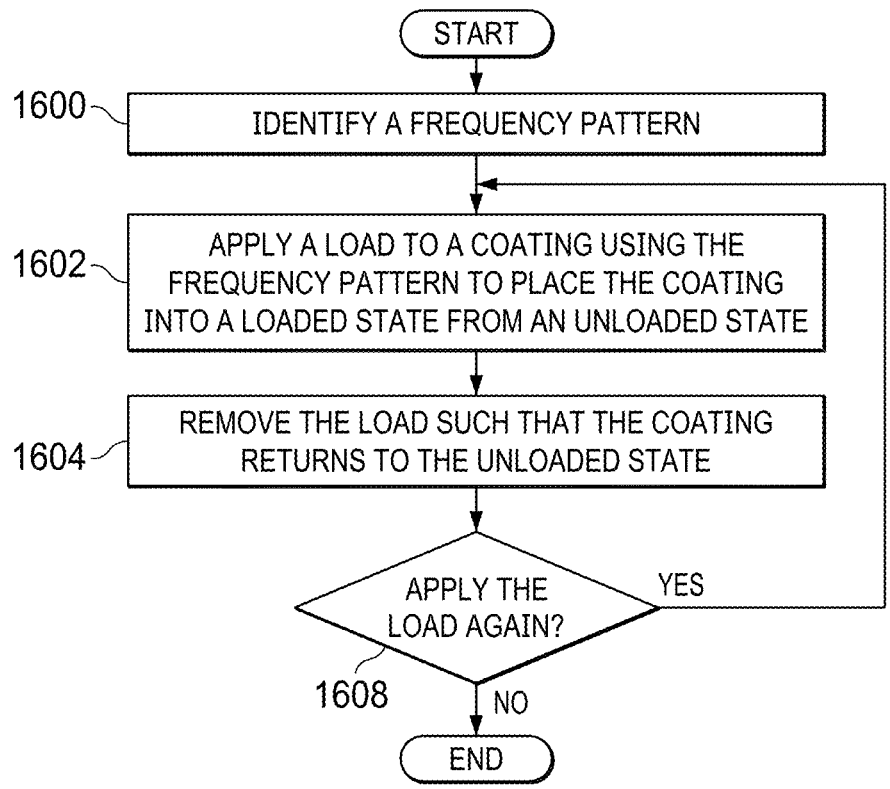
FIG. 16 is an illustration of a flowchart of a process for placing an area into alternating unloaded states and loaded states in accordance with an illustrative embodiment.

Turning next to FIG. 16, an illustration of a flowchart of a process for placing an area into alternating unloaded states and loaded states is depicted in accordance with an illustrative embodiment. The process in FIG. 16 can be implemented in hardware, software, or both. When implemented in software, the process can take the form of program code that is run by one or more processor units located in one or more hardware devices in one or more computer systems. For example, the process can be implemented in controller 226 in computer system 256 in FIG. 2. Controller 226 can control the operation of a load generator.

The process begins by identifying a frequency pattern (operation 1600). The frequency pattern can change at least one of a duration or amplitude of a load. The process applies the load to a coating using the frequency pattern to place the coating into a loaded state from an unloaded state (operation 1602). The process removes the load such that the coating returns to the unloaded state (operation 1604). A determination is made as to whether to apply the load again (operation 1606). If the load is to be applied again, the process returns to operation 1602. Otherwise, the process terminates.

Figure 17:
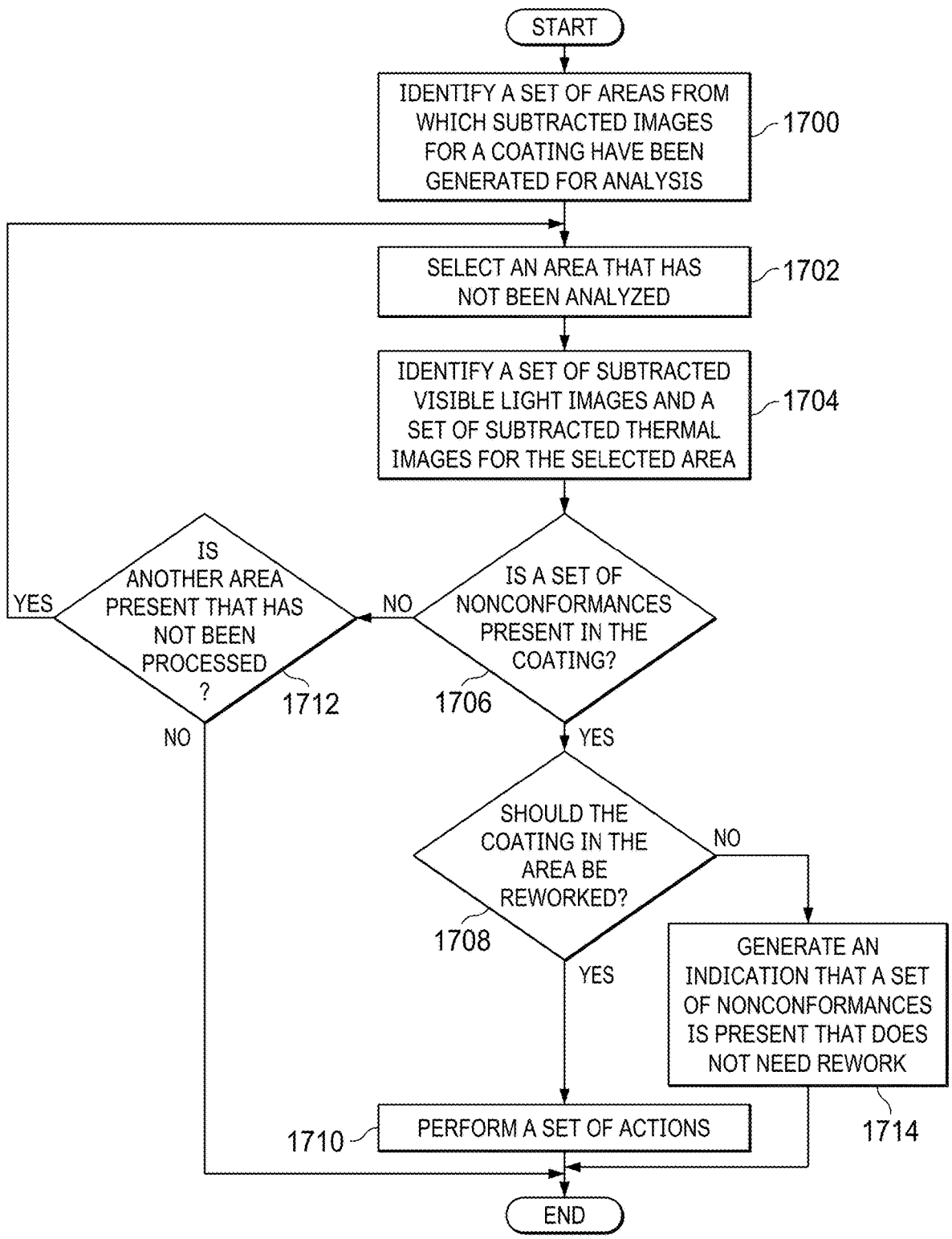
FIG. 17 is an illustration of a flowchart of a process for analyzing images in accordance with an illustrative embodiment.

Referring to FIG. 17, an illustration of a flowchart of a process for analyzing images is depicted in accordance with an illustrative embodiment. The process in FIG. 17 can be implemented in hardware, software, or both. When implemented in software, the process can take the form of program code that is run by one or more processor units located in one or more hardware devices in one or more computer systems. For example, the process can be implemented in controller 226 in computer system 256 in FIG. 2.

The process begins by identifying a set of areas from which subtracted images for a coating have been generated for analysis (operation 1700). The subtracted images include subtracted visible light images and subtracted thermal images. The process selects an area that has not been analyzed (operation 1702).

The process identifies a set of subtracted visible light images and a set of subtracted thermal images for selected area (operation 1704). The different subtracted visible light images and subtracted thermal images in operation 1704 can be based on subtraction of loaded visible light images visible from the unloaded visible light image and loaded thermal images subtracted from the unloaded thermal images in which the loaded visible light images and the loaded thermal images are generated at different times when the load with the code is applied to the structure using a frequency pattern.

In this illustrative example, a determination is made as to whether a set of nonconformances is present in the coating (operation 1706). If a set of nonconformances is present in the coating, a determination is made as to whether the coating in the area should be reworked (operation 1708). Operation 1706 and operation 1708 can be performed using a process for systems such as artificial intelligence system 276 in FIG. 2.

In this illustrative example, artificial intelligence system 276 has been trained to detect nonconformances through machine learning. Artificial intelligence system 276 has also been trained to determine when nonconformances require rework. Three main categories of machine learning are present for training an artificial intelligence system model. These categories are a supervised learning algorithm, an unsupervised learning algorithm, and a reinforcement learning algorithm.

In the illustrate example, a supervised machine learning algorithm comprises providing the machine with training data and the correct output value of the data. During supervised learning, the values for the output are provided along with the training data (labeled dataset) for the model building process. The algorithm, through trial and error, deciphers the patterns that exist between the input training data and the known output values to create a model that can reproduce the same underlying rules with new data. Examples of supervised learning algorithms include regression analysis, decision trees, k-nearest neighbors, neural networks, and support vector machines.

If an unsupervised learning algorithm is used, not all of the variables and data patterns are labeled, forcing the artificial intelligence machine model to discover hidden patterns and create labels on its own through the use of unsupervised machine learning algorithms. Unsupervised machine learning has the advantage of discovering patterns in the data with no need for labeled datasets. Examples of algorithms used in unsupervised machine learning include k-means clustering, association analysis, and descending clustering.

Whereas supervised machine learning algorithms and unsupervised machine learning algorithms cause the artificial intelligence model to learn from a dataset, reinforcement machine learning methods result in the artificial intelligence model learning from interactions with an environment. Algorithms such as Q-learning are used to train the artificial intelligence model through interacting with the environment using measurable performance criteria.

Training data for actual data in the form of images includes at least one of unloaded visible light images, unloaded thermal images, loaded visible light images, loaded thermal images, subtracted visible light images, or subtracted thermal images and can be used in performing machine learning using one or more machine learning techniques. Further, user input from human operators such as subject matter experts can receive training data to indicate when nonconformances are present. In a similar fashion, user input indicating when nonconformances are such that the nonconformances require rework of a coating can be received as training data.

If the coating should be reworked, the process performs a set of actions (operation 1710). The process terminates thereafter.

In this illustrative example, the set of actions can take a number of different forms. For example, the set of actions can include generating an alert, creating a work order for the area, adding an entry in a log of nonconformances to be reworked, displaying at least one of the subtracted visible light image or the subtracted thermal image with a graphical indication of the set of nonconformances that should be reworked, or other suitable actions.

With reference again to operation 1706, if a set of nonconformances is absent from the area, the process determines whether another area is present that has not been processed (operation 1712). If another area is present, the process returns to operation 1702. Otherwise, the process terminates.

With reference again to operation 1708, if the coating in the area should not be reworked, the process generates an indication that the set of nonconformances that is present does not need rework (operation 1714). The process terminates thereafter. The indication can be an entry in a log of nonconformances that do not need the rework, a display of a graphical indication on a subtracted image, or some other suitable type of indication.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 18:
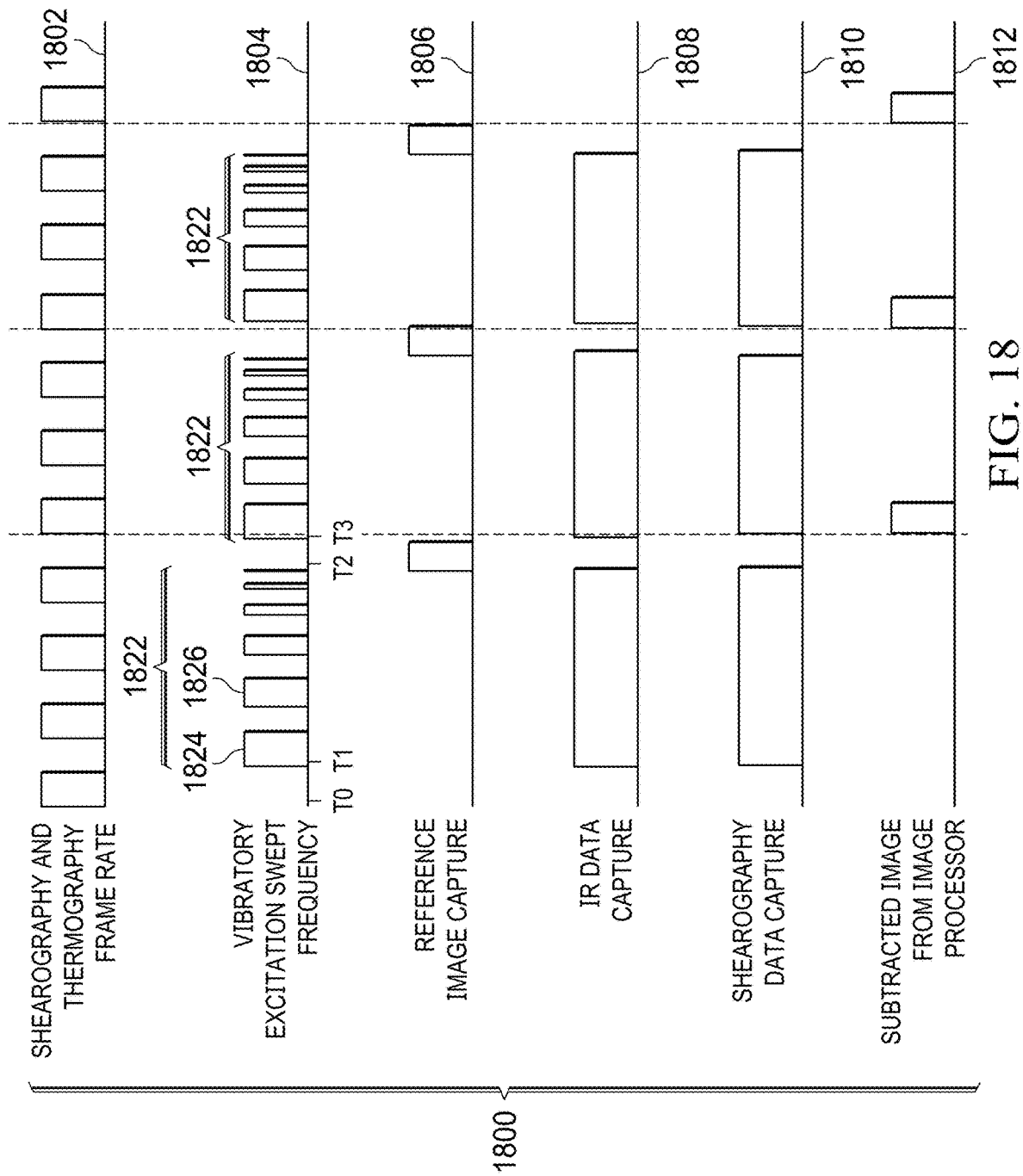
FIG. 18 is an illustration of a timing diagram used to generate images in accordance with an illustrative embodiment.

Turning next to FIG. 18, an illustration of a timing diagram used to generate images is depicted in accordance with an illustrative embodiment. Timing diagram 1800 illustrates timing that can be implemented in imaging system 205 to generate images detecting a set of nonconformances 212 in FIG. 2. In this illustrative example, x-axes in the different rows illustrate time while the y-axes in the different rows represent the amplitude of signals shown in digital form.

In this illustrative example, row 1802 illustrates timing for frame rates used in both a drug camera and an infrared camera. As depicted, row 1802 illustrates the times during which the sensors in a thermography camera and an infrared camera can generate data for images.

In this illustrative example, row 1804 indicates the timing and duration of loads applied to a coating. As depicted in this illustrative example, duration changes are based on frequency pattern 1822. For example, signal 1824 has a longer duration than signal 1826. In this particular example, frequency pattern 1822 is a swept frequency pattern that is repeated as shown in row 1804.

In the depicted example, row 1804 shows that the coating is unloaded at time T0 and becomes loaded at time T1. The loading is applied using frequency pattern 1822 until time T2. The coating is then unloaded until time T3 when loading occurs again using frequency pattern 1822. In this manner, alternating loading and unloading of the coating can be performed using a frequency pattern.

In other illustrative examples, frequency pattern 1822 can take other forms. For example, frequency pattern 1822 can be a constant frequency, a glide sweep, or some other suitable pattern. Further, the frequency pattern can be changed between loading and unloading of the coating.

As depicted, row 1806 illustrates the capture of reference images. During time T2 and time T3, data can be captured from the shearography camera and infrared camera to generate reference images of the coating in the unloaded state.

In this illustrative example, row 1808 indicates the timing for capturing infrared data from the infrared camera to generate thermal images. Row 1810 indicates the capturing of shearography data from a shearography camera to generate visible light images. In this illustrative example, the capture of data is shown to extend from time T1 to time T2, which is during the time period in which the coating is in a loaded state.

Row 1812 illustrates a generation of subtracted images. The subtracted images are generated by subtracting images generated during infrared data capture in row 1808 and the shearography data captured in row 1810 from images generated during reference image capture in row 1806.

Figure 19:
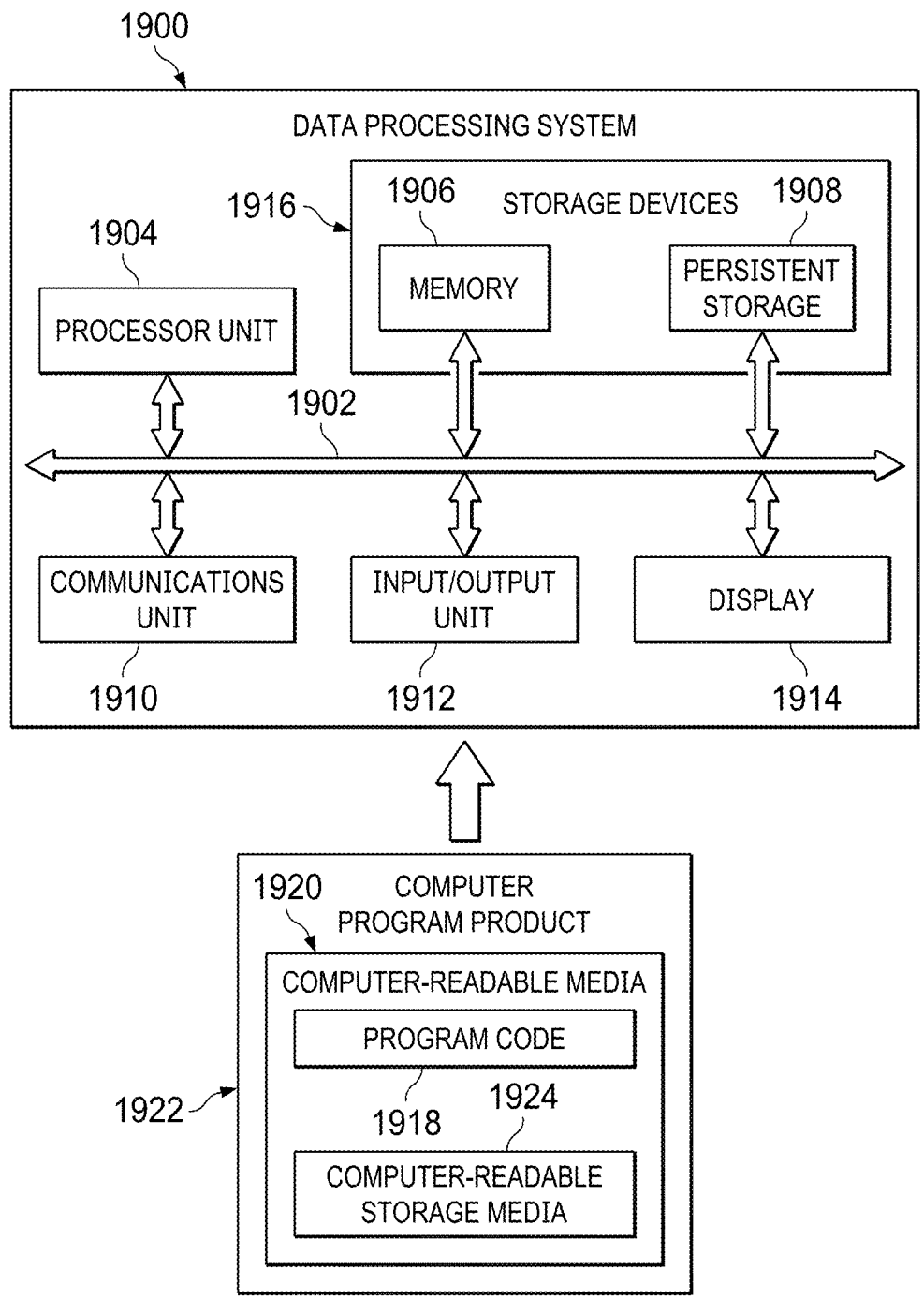
FIG. 19 is an illustration of a block diagram of a data processing system in accordance with an illustrative embodiment.

Turning now to FIG. 19, an illustration of a block diagram of a data processing system is depicted in accordance with an illustrative embodiment. Data processing system 1900 can be used to implement computer 108 in FIG. 1 and computer system 256 in FIG. 2. In this illustrative example, data processing system 1900 includes communications framework 1902, which provides communications between processor unit 1904, memory 1906, persistent storage 1908, communications unit 1910, input/output (I/O) unit 1912, and display 1914. In this example, communications framework 1902 takes the form of a bus system.

Processor unit 1904 serves to execute instructions for software that can be loaded into memory 1906. Processor unit 1904 includes one or more processors. For example, processor unit 1904 can be selected from at least one of a multicore processor, a central processing unit (CPU), a graphics processing unit (GPU), a physics processing unit (PPU), a digital signal processor (DSP), a network processor, or some other suitable type of processor.

Memory 1906 and persistent storage 1908 are examples of storage devices 1916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1916 may also be referred to as computer-readable storage devices in these illustrative examples. Memory 1906, in these examples, can be, for example, a random-access memory or any other suitable volatile or non-volatile storage device. Persistent storage 1908 can take various forms, depending on the particular implementation.

For example, persistent storage 1908 may contain one or more components or devices. For example, persistent storage 1908 can be a hard drive, a solid-state drive (SSD), a flash memory, a rewritable optical disk, a rewritable magnetic tape, or some combination of the above. The media used by persistent storage 2008 can also be removable. For example, a removable hard drive can be used for persistent storage 1908.

Communications unit 1910, in these illustrative examples, provides for communications with other data processing systems or devices. In these illustrative examples, communications unit 1910 is a network interface card.

Input/output unit 1912 allows for input and output of data with other devices that can be connected to data processing system 1900. For example, input/output unit 1912 can provide a connection for user input through at least one of a keyboard, a mouse, or some other suitable input device. Further, input/output unit 1912 can send output to a printer. Display 1914 provides a mechanism to display information to a user.

Instructions for at least one of the operating system, applications, or programs can be located in storage devices 1916, which are in communication with processor unit 1904 through communications framework 2002. The processes of the different embodiments can be performed by processor unit 1904 using computer-implemented instructions, which can be located in a memory, such as memory 1906.

These instructions are referred to as program code, computer usable program code, or computer-readable program code that can be read and executed by a processor in processor unit 1904. The program code in the different embodiments can be embodied on different physical or computer-readable storage media, such as memory 1906 or persistent storage 1908.

Program code 1918 is located in a functional form on computer-readable media 1920 that is selectively removable and can be loaded onto or transferred to data processing system 1900 for execution by processor unit 1904. Program code 1918 and computer-readable media 1920 form computer program product 1922 in these illustrative examples. In the illustrative example, computer-readable media 1920 is computer-readable storage media 1924.

In these illustrative examples, computer-readable storage media 1924 is a physical or tangible storage device used to store program code 1918 rather than a medium that propagates or transmits program code 1918.

Alternatively, program code 1918 can be transferred to data processing system 1900 using a computer-readable signal media. The computer-readable signal media can be, for example, a propagated data signal containing program code 1918. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 1900 are not meant to provide architectural limitations to the manner in which different embodiments can be implemented. In some illustrative examples, one or more of the components may be incorporated in or otherwise form a portion of, another component. For example, memory 1906, or portions thereof, can be incorporated in processor unit 1904 in some illustrative examples. The different illustrative embodiments can be implemented in a data processing system including components in addition to or in place of those illustrated for data processing system 1900. Other components shown in FIG. 19 can be varied from the illustrative examples shown. The different embodiments can be implemented using any hardware device or system capable of running program code 1918.

Figure 20:
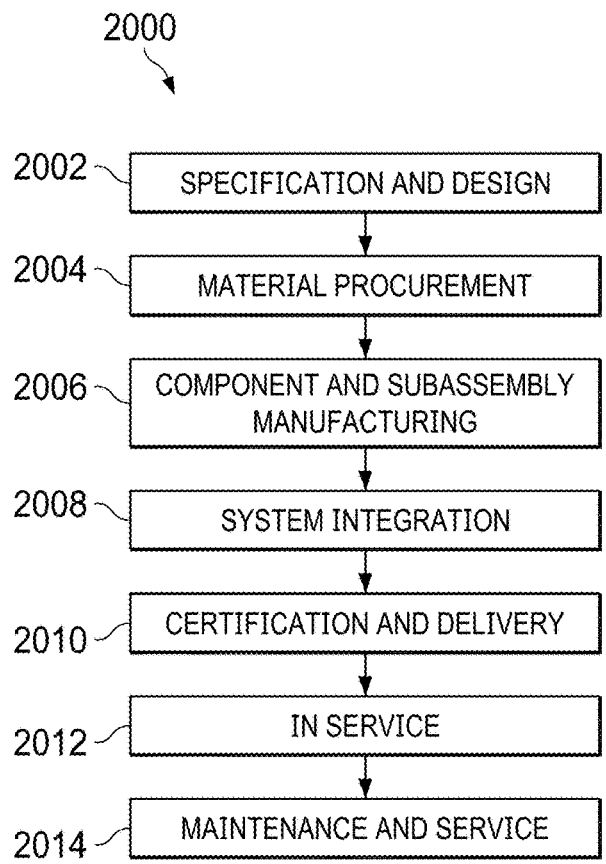
FIG. 20 is an illustration of an aircraft manufacturing and service method in accordance with an illustrative embodiment.
Figure 21:
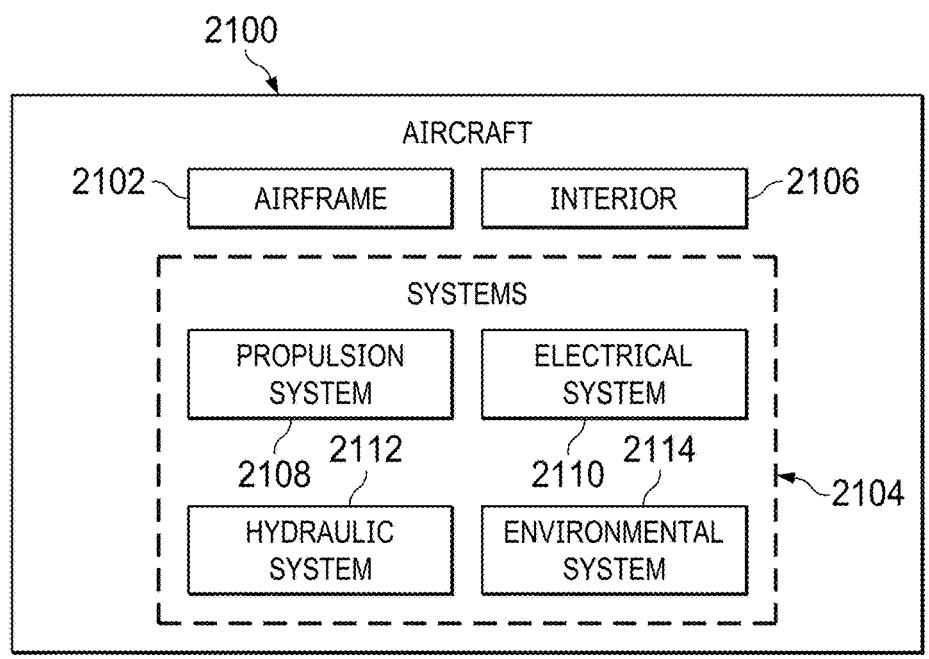
FIG. 21 is an illustration of a block diagram of an aircraft in which an illustrative embodiment may be implemented.

Illustrative embodiments of the disclosure may be described in the context of aircraft manufacturing and service method 2000 as shown in FIG. 20 and aircraft 2100 as shown in FIG. 21. Turning first to FIG. 20, an illustration of an aircraft manufacturing and service method is depicted in accordance with an illustrative embodiment. During pre-production, aircraft manufacturing and service method 2000 may include specification and design 2002 of aircraft 2100 in FIG. 21 and material procurement 2004.

During production, component and subassembly manufacturing 2006 and system integration 2008 of aircraft 2100 in FIG. 21 takes place. Thereafter, aircraft 2100 in FIG. 21 can go through certification and delivery 2010 in order to be placed in service 2012. While in service 2012 by a customer, aircraft 2100 in FIG. 21 is scheduled for routine maintenance and service 2014, which may include modification, reconfiguration, refurbishment, and other maintenance or service.

Each of the processes of aircraft manufacturing and service method 2000 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 21, an illustration of an aircraft is depicted in which an illustrative embodiment may be implemented. In this example, aircraft 2100 is produced by aircraft manufacturing and service method 2000 in FIG. 20 and may include airframe 2102 with plurality of systems 2104 and interior 2106. Examples of systems 2104 include one or more of propulsion system 2108, electrical system 2104, hydraulic system 2112, and environmental system 2114. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2000 in FIG. 20. For example, imaging system 205 in FIG. 2 can be used to perform inspections of coatings on aircraft 2100 during different stages such as component and subassembly manufacturing 2006, system integration 2008, certification and delivery 2010, and maintenance and service 2014. Imaging system 205 can be used to perform inspections after coatings are added to structures for aircraft 2100 during manufacturing of aircraft 2100. Additionally, imaging system 205 to perform inspections of coatings during routine maintenance and service, modification, reconfiguration, refurbishment, and other maintenance or service that can occur during maintenance and service 2014.

In one illustrative example, components or subassemblies produced in component and subassembly manufacturing 2006 in FIG. 20 can be fabricated or manufactured in a manner similar to components or subassemblies produced while aircraft 2100 is in service 2012 in FIG. 20. As yet another example, one or more apparatus embodiments, method embodiments, or a combination thereof can be utilized during production stages, such as component and subassembly manufacturing 2006 and system integration 2008 in FIG. 20. One or more apparatus embodiments, method embodiments, or a combination thereof may be utilized while aircraft 2100 is in service 2012, during maintenance and service 2014 in FIG. 20, or both. The use of a number of the different illustrative embodiments may substantially expedite the assembly of aircraft 2100, reduce the cost of aircraft 2100, or both expedite the assembly of aircraft 2100 and reduce the cost of aircraft 2100.

Figure 22:
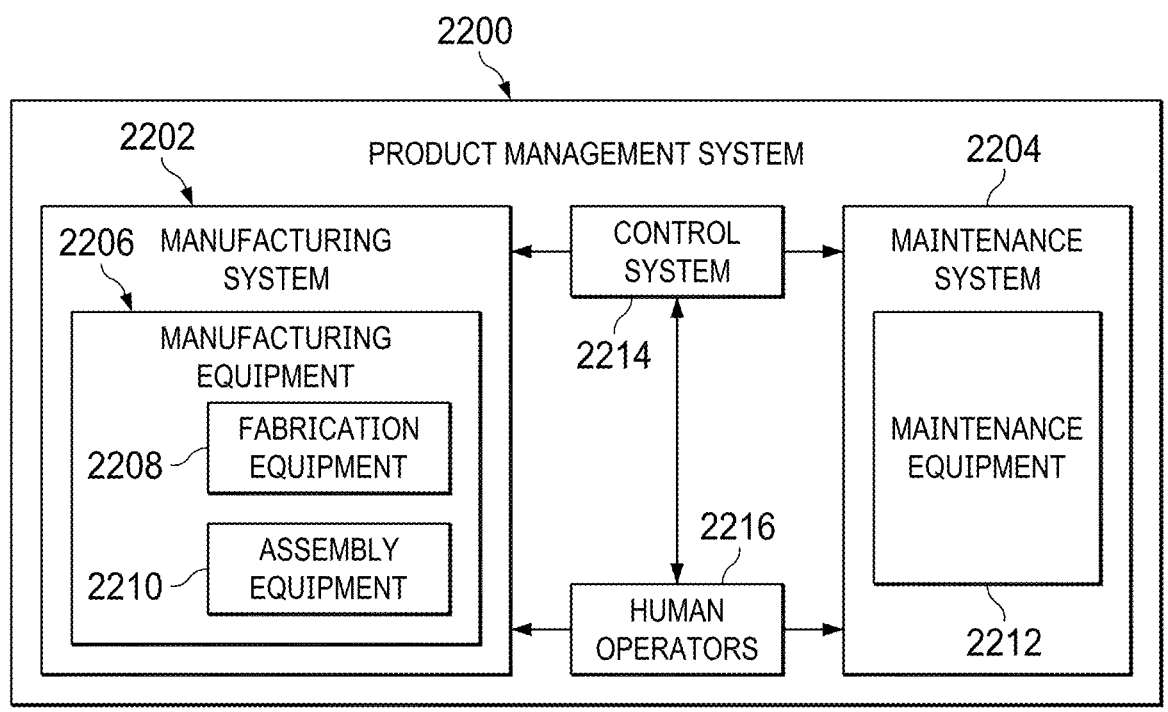
FIG. 22 is an illustration of a block diagram of a product management system in accordance with an illustrative embodiment.

Turning now to FIG. 22, an illustration of a block diagram of a product management system is depicted in accordance with an illustrative embodiment. Product management system 2200 is a physical hardware system. In this illustrative example, product management system 2200 includes at least one of manufacturing system 2202 or maintenance system 2204.

Manufacturing system 2202 is configured to manufacture products, such as aircraft 2100 in FIG. 21. As depicted, manufacturing system 2202 includes manufacturing equipment 2206. Manufacturing equipment 2206 includes at least one of fabrication equipment 2208 or assembly equipment 2210.

Fabrication equipment 2208 is equipment that is used to fabricate components for parts used to form aircraft 2100 in FIG. 21. For example, fabrication equipment 2208 can include machines and tools. These machines and tools can be at least one of a drill, a hydraulic press, a furnace, a mold, a composite tape laying machine, a vacuum system, a lathe, or other suitable types of equipment. Fabrication equipment 2208 can be used to fabricate at least one of metal parts, composite parts, semiconductors, circuits, fasteners, ribs, skin panels, spars, antennas, or other suitable types of parts.

Assembly equipment 2210 is equipment used to assemble parts to form aircraft 2100 in FIG. 21. In particular, assembly equipment 2210 is used to assemble components and parts to form aircraft 2100 in FIG. 21. Assembly equipment 2210 also can include machines and tools. These machines and tools may be at least one of a robotic arm, a crawler, a faster installation system, a rail-based drilling system, or a robot. Assembly equipment 2210 can be used to assemble parts such as seats, horizontal stabilizers, wings, engines, engine housings, landing gear systems, and other parts for aircraft 2100 in FIG. 21. Further, assembly equipment 2210 can include imaging system 205, which can be used to perform inspections of coatings applied during manufacturing or assembly of parts to form aircraft 2100.

In this illustrative example, maintenance system 2204 includes maintenance equipment 2212. Maintenance equipment 2212 can include any equipment needed to perform maintenance on aircraft 2100 in FIG. 21. Maintenance equipment 2212 may include tools for performing different operations on parts on aircraft 2100 in FIG. 21. These operations can include at least one of disassembling parts, refurbishing parts, inspecting parts, reworking parts, manufacturing replacement parts, or other operations for performing maintenance on aircraft 2100 in FIG. 21. These operations can be for routine maintenance, inspections, upgrades, refurbishment, or other types of maintenance operations. Maintenance equipment 2212 can also include imaging system 205 for use in inspecting coatings on structures in aircraft 2100 for nonconformances.

In the illustrative example, maintenance equipment 2212 may include ultrasonic inspection devices, x-ray imaging systems, vision systems, drills, crawlers, and other suitable devices. In some cases, maintenance equipment 2212 can include fabrication equipment 2208, assembly equipment 2210, or both to produce and assemble parts that needed for maintenance.

Product management system 2200 also includes control system 2214. Control system 2214 is a hardware system and may also include software or other types of components. Control system 2214 is configured to control the operation of at least one of manufacturing system 2202 or maintenance system 2204. In particular, control system 2214 can control the operation of at least one of fabrication equipment 2208, assembly equipment 2210, or maintenance equipment 2212.

The hardware in control system 2214 can be implemented using hardware that may include computers, circuits, networks, and other types of equipment. The control may take the form of direct control of manufacturing equipment 2206. For example, robots, computer-controlled machines, and other equipment can be controlled by control system 2214. In other illustrative examples, control system 2214 can manage operations performed by human operators 2216 in manufacturing or performing maintenance on aircraft 2200. For example, control system 2214 can assign tasks, provide instructions, display models, or perform other operations to manage operations performed by human operators 2216. In these illustrative examples, controller 226 in FIG. 2 can be implemented in control system 2214 to manage at least one of the manufacturing or maintenance of aircraft 2100 in FIG. 21. Action 270 in FIG. 2 can be implemented by control 226 to generate work orders when nonconformances requiring rework are detected in coatings. These work orders can be automatically performed by automated equipment in at least one of fabrication equipment 2208, assembly equipment 2210, or maintenance equipment 2212. The work orders can also be issued to human operators 2216 perform the rework.

In the different illustrative examples, human operators 2216 can operate or interact with at least one of manufacturing equipment 2206, maintenance equipment 2212, or control system 2214. This interaction can occur to manufacture aircraft 2100 in FIG. 21.

Of course, product management system 2200 may be configured to manage other products other than aircraft 2100 in FIG. 21. Although product management system 2200 has been described with respect to manufacturing in the aerospace industry, product management system 2200 can be configured to manage products for other industries. For example, product management system 2200 can be configured to manufacture products for the automotive industry as well as any other suitable industries.

Thus, the illustrative embodiments provide a method, apparatus, and system for detecting nonconformances. For example, the illustrative embodiments provide a method, apparatus, and system for detecting nonconformances in a coating on a structure. An area of a coating on a structure is placed into a loaded state from an unloaded state. A laser beam is directed towards a surface in the area of the structure. Unloaded visible light images of the area are generated in the unloaded state, and loaded visible light images of the area are generated in the loaded state. Unloaded thermal images of the area are generated in the unloaded state, and loaded thermal images of the area are generated in the loaded state. Loaded visible light images are subtracted from the unloaded visible light images to form subtracted visible light images. The loaded thermal images are subtracted from the unloaded thermal images to form subtracted thermal images. A determination is made as to whether a nonconformance is present using the subtracted visible light images and the subtracted thermal images.

The images generated using shearography and thermal imaging in a loaded state and an unloaded state and the subtracted images generated in the loaded state from images generated in the unloaded state can increase the ability to detect nonconformances that may require rework. Further, the nonconformances can be detected that do not require rework. As result, the amount of rework of an object such as aircraft can be reduced.

One or more illustrative examples apply a load to the coating in a manner that the load exaggerates or increases the extent of a nonconformance in the coating. For example, the load can be applied in a manner that increases a gap in debonding of a paint layer from a metal skin panel. An increase in the gap can occur as compared to when less or no debonding is present. Thus, the thermal imaging can be used in combination with shearography to detect debonding or other nonconformances in addition to moisture that is currently detected. In this manner, the illustrative examples enable determining whether a nonconformance such as a crack in the paint of an aircraft should be reworked with more certainty as compared to currently used techniques.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A imaging system comprising:
   a vacuum chamber configured to apply a vacuum to an area with a coating on a structure;
   a load generator configured to place the area into a loaded state from an unloaded state;
   a laser system configured to direct a laser beam towards a surface of the coating in the area;
   a shearography camera system configured to generate an unloaded visible light image of the area in the unloaded state and a loaded visible light image of the area in the loaded state, while the laser beam is directed toward the surface of the coating;
   an infrared camera system configured to detect infrared radiation and generate an unloaded thermal image of the area in the unloaded state and a loaded thermal image of the area in the loaded state from the infrared radiation detected; and
   a controller configured to receive the unloaded visible light image, the loaded visible light image, the unloaded thermal image, and the loaded thermal image and subtract the loaded visible light image from the unloaded visible light image to form a subtracted visible light image, and subtract the loaded thermal image from the unloaded thermal image to form a subtracted thermal image.

2. The imaging system of claim 1 further comprising:
   a display system, wherein the controller displays at least one of the subtracted visible light image or the subtracted thermal image on the display system.

3. The imaging system of claim 1 further comprising:
   a visible light camera system that generates an image of the surface of the coating on the structure, wherein the controller superimposes at least one of the subtracted visible light image or the subtracted thermal image on the image of the surface on a display system.

4. The imaging system of claim 1, wherein placing the area into the loaded state from the unloaded state by the load generator increases a prominence of a nonconformance in the coating.

5. The imaging system of claim 1, wherein at least one of the subtracted visible light image or the subtracted thermal image indicates a set of nonconformances in the coating.

6. The imaging system of claim 5, wherein the set of nonconformances includes at least one of a superficial crack, a delamination, a debonding, or moisture.

7. The imaging system of claim 1, wherein the controller controls the load generator and causes the load generator to place the area on the structure into alternating unloaded states and loaded states with a frequency pattern.

8. The imaging system of claim 7, wherein the frequency pattern defines a duration of a load placed on the structure by the load generator and wherein the frequency pattern for the duration of the load includes at least one of a constant frequency, a glide sweep, or a stepped sweep.

9. The imaging system of claim 7, wherein the frequency pattern defines an amplitude of a load placed on the structure by the load generator and wherein the frequency pattern for the amplitude of the load includes at least one of a constant frequency, a glide sweep, or a stepped sweep.

10. The imaging system of claim 1, wherein the vacuum is applied at a level that attaches the vacuum chamber to the surface of the coating of the structure.

11. The imaging system of claim 1, wherein the vacuum is applied at a level that attaches the vacuum chamber to the surface of the coating on the structure and applies a load to the coating.

12. The imaging system of claim 1, wherein the load generator, the laser system, the shearography camera system, and the infrared camera system are physically connected to the vacuum chamber.

13. The imaging system of claim 1, wherein the load generator includes at least one of a vibration unit, a piezoelectric transducer, a capacitive transducer, a pressure chamber, or a thermal source.

14. The imaging system of claim 1, wherein the coating comprises at least one of a paint layer, a clear coat layer, a polymer layer, a sealant layer, or primer layer.

15. An imaging system comprising:
a computer system with a controller, wherein the controller is configured to:
receive from a shearography camera system an unloaded visible light image generated of a coating an area of a structure while the area is in an unloaded state and a loaded visible light image generated while the area is in a loaded state;
receive from an infrared camera system an unloaded thermal image generated while the area is in the unloaded state and a loaded thermal image generated while the area is in the loaded state;
subtract the loaded visible light image from the unloaded visible light image to form a subtracted visible light image; and
subtract the loaded thermal image from the unloaded thermal image to form a subtracted thermal image.

16. The imaging system of claim 15, wherein placing the area into the loaded state from the unloaded state by the load generator increases a prominence of a nonconformance in the coating.

17. The imaging system of claim 15 further comprising:
a load generator that places the area into the loaded state from the unloaded state.

18. The imaging system of claim 16, wherein the load generator includes at least one of a vibration unit, a piezoelectric transducer, a capacitive transducer, a vacuum chamber, a pressure chamber, or a thermal source.

19. The imaging system of claim 15, wherein at least one of the subtracted visible light image or the subtracted thermal image indicate a set of nonconformances in the coating.

20. The imaging system of claim 15, wherein the controller controls a load generator to place the area in the loaded state from the unloaded state and controls a laser system to direct a laser beam to the coating in the area on the structure while the area is the unloaded state and the loaded state.

21. The imaging system of claim 20, the controller controls the load generator to place the area in the unloaded state and the loaded state, the controller controls the load generator to place the area on the structure into alternating unloaded states and loaded states with a frequency pattern.

22. The imaging system of claim 21, wherein the frequency pattern defines a duration of a load placed on the area by the load generator and wherein the frequency pattern for the duration of the load includes at least one of a constant frequency, a glide sweep, or a stepped sweep.

23. The imaging system of claim 21, wherein the frequency pattern defines an amplitude of a load placed on the area by the load generator and wherein the frequency pattern for the amplitude of the load includes at least one of a constant frequency, a glide sweep, or a stepped sweep.

24. The imaging system of claim 15, wherein the controller controls the shearography camera system to generate the unloaded visible light image of the area in the unloaded state and the loaded visible light image of the area in the loaded state while a laser beam is directed to the coating in the area and controls the infrared camera system to generate the unloaded thermal image of the area in the unloaded state and the loaded thermal image of the area in the loaded state.

25. A method of detecting nonconformances, the method comprising:
placing an area with a coating on a structure into a loaded state from an unloaded state;
directing a laser beam toward a surface of the coating in the area of the structure while the area is in the unloaded state and the loaded state;
generating an unloaded visible light image of the area in the unloaded state and a set of loaded visible light images of the area in the loaded state;
generating an unloaded thermal image of the area in the unloaded state and a set of loaded thermal images of the area in the loaded state;
subtracting the set of loaded visible light images from the unloaded visible light image to form a set of subtracted visible light images;
subtracting the set of loaded thermal images from the unloaded thermal image to form a set of subtracted thermal images; and
determining whether a nonconformance is present using the set of subtracted visible light images and the set of subtracted thermal images.

26. The method of claim 25, wherein placing the area with the coating on the structure into the loaded state from the unloaded state increases a prominence of the nonconformance in the coating.

27. The method of claim 25 further comprising:
displaying at least one of the set of subtracted visible light images or the set of subtracted thermal images on a display system.

28. The method of claim 25 further comprising:
superimposing at least one of the set of subtracted visible light images or the set of subtracted thermal images on images of the surface of the coating in the area in the unloaded state on a display system.

29. The method of claim 25, wherein at least one of the set of subtracted visible light images or the set of subtracted thermal images indicates a set of nonconformances in the coating.

30. The method of claim 29, wherein set of nonconformances includes at least one of a delamination, a debonding, or moisture.

31. The method of claim 25, wherein placing the area into the loaded state from the unloaded state comprises:
placing the area of the structure in alternating unloaded states and loaded states with a frequency pattern.

32. The method of claim 31, wherein the frequency pattern defines a duration of a load placed on the area, and wherein the frequency pattern for the duration of the load includes at least one of a constant frequency, a glide sweep, or a stepped sweep.

33. The method of claim 31, wherein the frequency pattern defines an amplitude of a load placed on the area, and wherein the frequency pattern for the amplitude of the load includes at least one of a constant frequency, a glide sweep, or a stepped sweep.

34. The method of claim 25 further comprising:
applying a vacuum to an area of coating on the structure that attaches a vacuum chamber to a surface of the coating.

35. The method of claim 34, wherein the vacuum is applied at a level that attaches the vacuum chamber to the surface of the coating and applies a load to the coating.

36. The method of claim 25, wherein the area is placed into the loaded state from the unloaded state by a load generator, and wherein the load generator includes at least one of a vibration unit, a piezoelectric transducer, or a capacitive transducer.

37. The method of claim 25, wherein the coating comprises at least one of a paint layer, a clear coat layer, a polymer layer, a sealant layer, or a primer layer.

* * * * *